United States Patent
Stratico et al.

(10) Patent No.: US 6,732,971 B2
(45) Date of Patent: May 11, 2004

(54) APPARATUS AND METHODS FOR WINDING AND TRANSFERRING DYNAMOELECTRIC MACHINE STATORS

(75) Inventors: Gianfranco Stratico, Siena (IT); Maurizio Mugelli, Siena (IT); Antonio Lumini, Florence (IT)

(73) Assignee: Axis U.S.A., Inc., Tampa, FL (US)

( * ) Notice: Subject to any disclaimer, the term of this patent is extended or adjusted under 35 U.S.C. 154(b) by 0 days.

(21) Appl. No.: 09/887,898

(22) Filed: Jun. 22, 2001

(65) Prior Publication Data

US 2002/0020778 A1 Feb. 21, 2002

Related U.S. Application Data

(60) Provisional application No. 60/251,197, filed on Dec. 4, 2000, provisional application No. 60/224,480, filed on Aug. 10, 2000, and provisional application No. 60/218,088, filed on Jul. 13, 2000.

(51) Int. Cl.[7] .............................................. H02K 15/85
(52) U.S. Cl. ................................................. 242/432.6
(58) Field of Search ........................ 242/432.4, 432.6

(56) References Cited

U.S. PATENT DOCUMENTS

| | | | |
|---|---|---|---|
| 4,679,312 A | * | 7/1987 | Nussbaumer et al. .......... 29/596 |
| 4,713,883 A | * | 12/1987 | Santandrea et al. ............ 29/736 |
| 4,858,835 A | | 8/1989 | Luciani et al. ............. 242/1.1 A |
| 4,965,924 A | | 10/1990 | Santandrea et al. ............ 29/596 |
| 4,969,606 A | | 11/1990 | Santandrea et al. ....... 242/1.1 R |
| 4,982,908 A | | 1/1991 | Luciani .................... 242/1.1 R |
| 4,984,353 A | | 1/1991 | Santandrea et al. ............ 29/714 |
| 4,997,138 A | | 3/1991 | Luciani et al. .............. 242/7.03 |
| 5,065,503 A | | 11/1991 | Luciani et al. ................. 29/735 |
| 5,137,221 A | | 8/1992 | Santandrea et al. ....... 242/1.1 R |
| 5,149,000 A | * | 9/1992 | Santandrea et al. ............ 29/596 |
| 5,186,405 A | * | 2/1993 | Beakes et al. ............... 242/432 |
| 5,207,745 A | | 5/1993 | Santandrea ............... 242/1.1 R |
| 5,233,751 A | | 8/1993 | Luciani et al. ................. 29/736 |
| 5,316,228 A | * | 5/1994 | Santandrea et al. ....... 242/432.4 |
| 5,370,324 A | * | 12/1994 | Beakes et al. ........... 242/432.4 |
| 5,383,618 A | * | 1/1995 | Santandrea et al. ...... 242/432.6 |
| 5,549,253 A | * | 8/1996 | Beakes et al. ............. 242/432.3 |
| 5,560,555 A | * | 10/1996 | Beakes et al. ............ 242/432.4 |
| 5,618,007 A | * | 4/1997 | Beakes et al. ........... 242/432.6 |
| 5,946,792 A | * | 9/1999 | Beakes ......................... 29/596 |
| 6,267,317 B1 | * | 7/2001 | Beakes et al. ........... 242/432.4 |

* cited by examiner

Primary Examiner—Kathy Matecki
Assistant Examiner—Sang Kim
(74) Attorney, Agent, or Firm—Fish & Neave; Robert R. Jackson; Edward M. Arons

(57) ABSTRACT

In systems for winding wire on electrodynamic machine stators, stators may be transferred between stator conveyance apparatus, winding shroud installation and removal apparatus, wire winding apparatus, wire lead termination apparatus, or other apparatus. Some transfer devices may secure stators in housings fixed to arms that may be rotated around an axis to move stators between stations. Some transfer devices may have stator grasping devices that may be rotated and translated to move stators between stations. Wire winding shrouds may be secured to a stator to facilitate winding and released from stator after wire is wound on the stator. A device for securing shrouds to the stator may be fixed to the stator and may remain fixed to the stator during transfer between different apparatus. Some devices for securing shrouds and stators may be integrated into housings. Some housings may be fixed to transfer devices along one side of the housing.

12 Claims, 18 Drawing Sheets

APPARATUS AND METHODS FOR WINDING AND TRANSFERRING DYNAMOELECTRIC MACHINE STATORS

CROSS REFERENCE TO RELATED APPLICATION

This claims the benefit of the following copending U.S. provisional patent applications: No. 60/218,088, filed Jul. 13, 2000; No. 60/224,480, filed Aug. 10, 2000; and No. 60/251,197, filed Dec. 4, 2000, all of which are hereby incorporated by reference herein in their entireties.

BACKGROUND OF THE INVENTION

The present disclosure relates to machinery required for winding stator core coils for dynamoelectric machines. In particular, the disclosure relates to transferring stator cores between stator winding apparatus, securing core winding shrouds to cores, and releasing the shrouds from the cores. Known core winding systems may include apparatus for conveying cores to and from machinery, load/unload devices for transferring cores between the conveyance apparatus and the winding machinery, and transfer devices for moving cores between various fixed stations of the winding machinery. Pallets and conveyors for this purpose are described in commonly assigned U.S. Pat. Nos. 4,965,924 and 4,984,353, which are hereby incorporated by reference herein in their entireties. Fixed stations are often established for performing specialized tasks related to the assembly of the stator. For example, a winding apparatus may include a station for winding wire coils onto the core, a station for anchoring the ends of the wire to the wound core (e.g., to anchoring devices or terminal connectors), and a station for transferring the wound core back to the conveyance apparatus.

Cores are often supported at winding or other assembly stations using a housing mounted on a transfer device. Known housings for this purpose are described in commonly assigned U.S. Pat. Nos. 4,969,606 and 5,137,221, which are hereby incorporated by reference herein in their entireties. Known housings can be difficult to attach and detach with respect to stator transfer devices and are often inefficiently coordinated with other specialized winding components such as transfer devices, shroud locking devices, and load/unload devices.

Wire coils for some cores may be wound using wire delivering needles moved in translational and rotational motion. Examples of such winders are described in commonly assigned U.S. Pat. No. 4,858,835, in commonly assigned U.S. Provisional Patent Applications Nos. 60/148,473, filed Aug. 12, 1999, and 60/214,218, filed Jun. 23, 2000, and in commonly assigned U.S. patent application Ser. No. 09/632,281, filed Aug. 4, 2000, all of which are hereby incorporated by reference herein in their entireties.

Winding shrouds are often used to guide wire delivered by the needles so turns of the coils can be properly positioned around the poles of the cores. Such winding shrouds are described in commonly assigned U.S. Pat. No. 4,982,908, which is hereby incorporated by reference herein in its entirety. Winding shrouds may be installed on a core prior to winding, held in place during winding, and removed after winding.

Multiple large machines occupying valuable floor space are often used to perform various operations involved in winding cores, such as shroud installation and removal, coil winding, coil termination, and stator transfer between stations. It is often difficult to coordinate the different operations. Machines must be arranged and their actions coordinated to avoid interfering with each other. Some machines, left idle while others finish performing a prerequisite assembly function, are underutilized. Slower machines reduce assembly line throughput. The numerous moving parts typically employed by the winding machinery are difficult to maintain and prone to failure.

Accordingly, it would be desirable to provide stator core winding apparatus and methods that reduce the space required to wind a stator core.

It would also be desirable to provide stator core winding apparatus and methods that reduce the number of separate machines and operations required to wind a stator core.

SUMMARY OF THE INVENTION

It is an object of the invention to provide stator core winding apparatus and methods that reduce the space required to wind a stator core.

It is also an object of the invention to provide stator core winding apparatus and methods that reduce the number of separate machines and operations required to wind a stator core.

In accordance with the principles of the invention, apparatus and methods for transferring dynamoelectric machine stator cores between assembly stations and for moving winding shrouds between stators may be provided. The apparatus may include a support member that may be rotated around an axis of rotation. The apparatus may include two stator support portions, each extending obliquely away from the axis. The support may be rotated to transfer stator cores between assembly stations. In some embodiments, the support member may have distal portions to which removable stator support housings may be attached. In some of these embodiments, the housings may project away from the distal portion in a direction leading away from the axis of rotation.

Some embodiments of the invention may provide apparatus and methods for securing ends of wire leads of dynamoelectric machine stators and transferring said stators between stator assembly apparatus and a stator conveyance system may also be provided. Some of these embodiments may include a wire lead anchoring device, a stator transfer device, and a stator load/unload device. The transfer device may transfer a wound stator to a position between the anchoring device and the load/unload device.

These embodiments may include a movable support structure, stator grippers, and a winding shroud retention device. The stator grippers and winding shroud retention devices may be fixed to the support structure. The winding shroud retention device may remove winding shrouds from a wound stator, retain the shrouds for use with a subsequent stator, and insert them in the subsequent stator after the apparatus delivers the subsequent stator to a winding station. In some embodiments, the invention may include a static winding shroud installation device for application of shrouds to one end of a stator and a dynamic, multipurpose transfer device for application of shrouds to the opposite end of a stator. In some of these embodiments, the multipurpose device may transfer stator cores between winding apparatus stations or between stations and conveyance devices.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
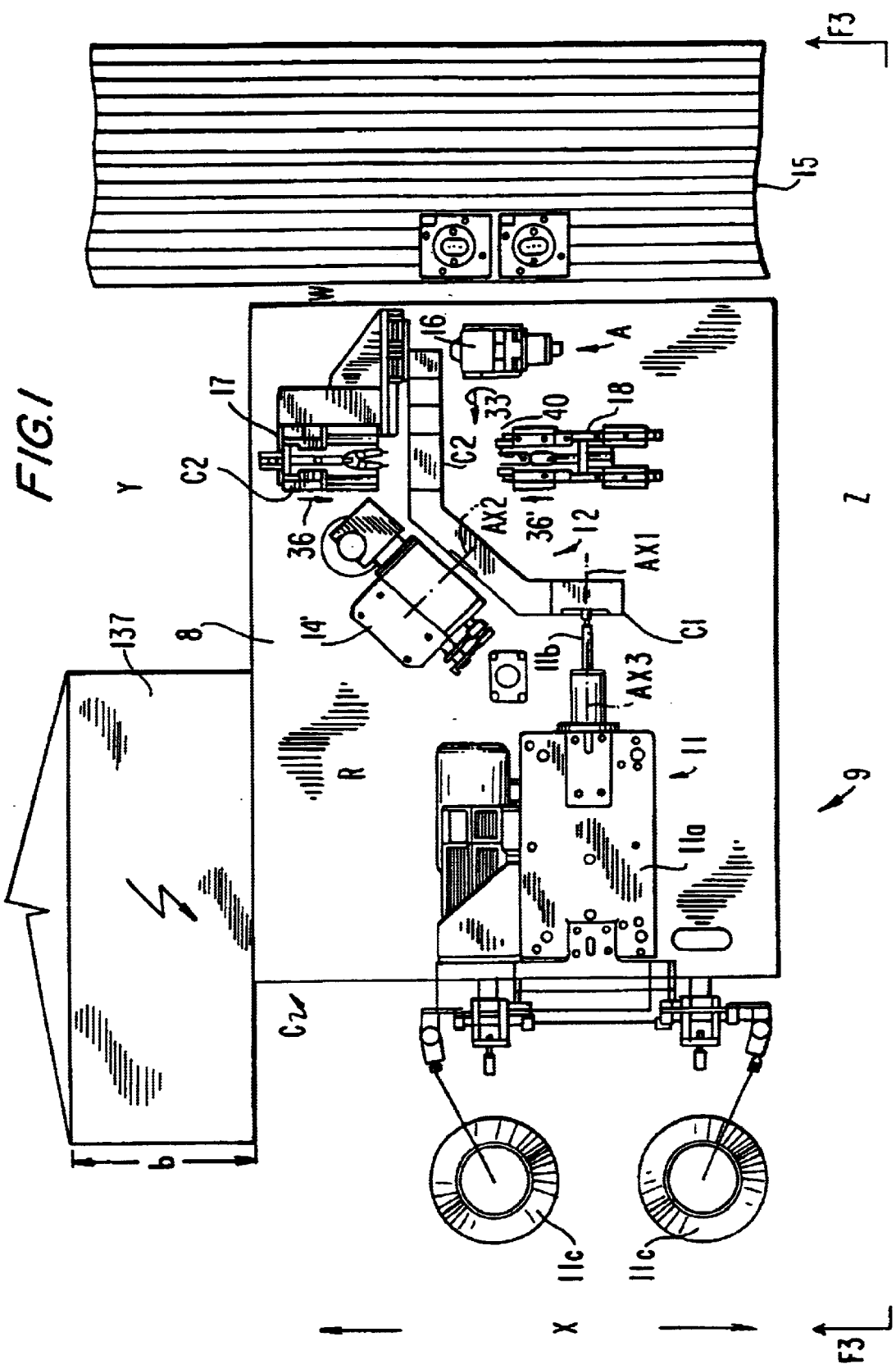
FIG. 1 is a plan view of an illustrative stator winding system in accordance with the principles of this invention.

In some embodiments, the invention may provide apparatus and methods for winding wire coils on dynamoelectric machine components in accordance with the principles of the invention. In some of these embodiments, apparatus may include a winding station, where wire coils may be wound on a machine component such as a stator, and a load/unload station for exchanging wound and unwound stators with a load/unload device capable of transferring stators between the load/unload station and a pallet conveyor, for example. The apparatus may include a support member configured to support machine components and rotate about an axis of rotation. The support member may be rotated, for example, by a shaft or crown. The support member may include portions configured to support stators (or other machine components) adjacent assembly stations. These portions may extend obliquely away from the axis of rotation. In some embodiments, this may enable the support member to exchange the positions of two machine components, for example, a wound stator and an unwound stator, by rotating through 180°.

When machine-component-bearing portions of the support member are arranged opposite each other and each extends away from the axis of rotation at an angle less than 90°, at least one of the horizontal dimensions of the apparatus may be reduced in comparison to an apparatus in which machine component-bearing portions extend perpendicularly away from the axis of rotation. The reduction in at least one horizontal dimension may allow winding machines to be more compactly arranged. For example, a larger number of narrower machines may arranged adjacent a given section of a pallet conveyor. (Similarly, a shorter run of conveyor would be required to service a given number of narrower winding machines.)

In some embodiments having oblique support member portions, a load/unload device that inserts machine components in a support member housing may be able to travel in a direction that is parallel to the motion of a machine component conveyor, such as a conveyor belt, but oblique to the axis of rotation.

In some embodiments, the invention may provide devices for removably installing and temporarily locking winding shrouds with respect to a machine component. Winding shrouds may guide wire as it is deposited from a wire dispenser onto poles of the machine component. In some of the embodiments that provide winding shroud installation and locking features, machine components may be housed within housings attached to a rotating support member. In some embodiments, shroud installation and locking features may be provided by an independent device that operates in cooperation with the housing and rotating support member. In some embodiments, the features may integrated into a machine component housing. Some housings may be adjustable to accommodate machine components of different lengths.

In some embodiments, the invention may include machine component housings that are removably attachable to the end of a rotating support member. Removably attachable machine component housings may be fixed to the extreme end of a rotating support member. Some housings may be positioned so that they extend (or project) away from the support member in a direction that is oblique to the rotational axis of the support member. Some housings may be attached to the support member at only one side of the housings (e.g., as a cantilever). Some housings may include a dovetail fitting for attachment to a rotating support member by mortise and tenon, which may comprise steel.

In some embodiments, housings may be attached to an intermediate attachment portion of a rotating support member. Intermediate portions may function as an interface between a rotating support member and a housing. Intermediate portions may comprise steel to provide strength for countering forces produced by rotation of housings and for allowing precision machining of parts related to actuation of movable members in housings. (For example, a steel intermediate portion may include a steel dovetail groove to join to a steel housing dovetail.) Rotating support members may comprise aluminum to reduce inertial and centrifugal forces that arise during rotation. The steel intermediate portion may be secured to the aluminum support member by any suitable means, for example, bolts.

Some housings may include, for example, a top, a bottom, and two sides. One of the sides may be used for securing the housing to rotating support member (for example, via an intermediate portion) while the top and bottom may be provided with repositionable locking blades for securing winding shrouds to a machine component. In some of these housings, a first pair of locking blades (top and bottom blades) may be fixed with respect to a central axis of the housing while a second pair of blades may be mounted on a frame that can traverse along the housing parallel to the central axis. By sliding the frame with respect to the housing, the spacing between the blade pairs can be adjusted to accommodate a range of stator sizes.

Some housings may be provided with a clamp for applying force to a machine component to secure it within the housing. Some clamps may be actuated by an elongated member, or a series of linked members, that may pass through the side of the housing attached to the support member, reciprocate with respect to the central axis of the housing, and transmit force from an actuating device, such as a spring or piston, to the clamp.

Some embodiments of the invention may include a machine component winder and a transfer device (for example, a rotating arm, a vertical transfer table, or a horizontal transfer table) for moving machine components from the winder to a station in between a wire lead anchoring device (for securing the ends of wire coils to termination devices on the components) and a load/unload device opposite the anchoring device. This configuration may enable the anchoring device to operate adjacent one end of a machine component and the load/unload device to operate adjacent the opposite end. Some embodiments may include a device for temporarily securing wire coil ends, for example, after coils are deposited on a machine component, but before the anchoring device anchors the leads.

In some embodiments, the invention may provide a load/unload device that may be used, for example, to transfer machine components between assembly stations of a machine component winding apparatus and a machine component conveyance device. In some of these embodiments, the load/unload device may include one or more pairs of opposing grippers for grasping and releasing machine components. Gripper pairs may be controlled, for example, using an actuator. Some actuators may be used in combination with biasing springs. Two or more gripper pairs may be mounted on a movable support member. The movable support member may be rotatable and translatable to rotate, translate, or otherwise manipulate a grasped machine component.

In embodiments of the load/unload device having more than one gripper pair, the load/unload device may use one gripper pair to carry an untreated machine component from an original station to a target station, occupied by an already treated machine component, for example, and another gripper pair to remove the treated machine component from the target station. The load/unload device may be repositioned as necessary to remove the treated machine component from the target station, deliver the untreated machine component to the target station, and transfer the treated machine component to the original station.

In some embodiments of the load/unload device, each gripper pair may be associated with a winding shroud retention device. Each winding shroud retention device may be mounted on a support member in proximity to the corresponding gripper pair. Each gripper pair and associated winding shroud retention device may be supported by the same support member. Winding shroud retention devices may be configured to retain and release winding shrouds used during machine component winding.

In some embodiments of the invention using a load/unload device, a winding shroud may be associated with each shroud retention device. In some of these embodiments, the motion of the movable support structure and the actuation of grippers and shroud retention devices may be coordinated so that the insertion and removal of shrouds with respect to machine components can be performed by the load/unload device.

In some embodiments using a load/unload device, shroud retention devices may be positioned relative to grippers so that the unload device can insert shrouds in (and remove shrouds from) a machine component by adding only a small additional translation to the load/unload device trajectory. For example, in conjunction with the removal of a machine component from a housing, the load/unload device may remove shrouds from the machine component. The load/unload device may be brought close enough to the machine component to engage the installed shrouds with a shroud retention device extending toward the machine component. The associated grippers, which may extend in the same direction as the shroud retention device, but may be longer than the shroud retention device, may pass along the outside of the machine component farther than is necessary to grasp the component. After the shrouds are retained, the load/unload device may move away from the machine component to a position suitable for the grippers to grasp the machine component. As the load/unload device moves away from the machine component, but before the grippers grasp the machine component, the retained shrouds may become separated from the machine component. The separated shrouds may be reused for winding another machine component. The installation of a set of shrouds in a machine component may proceed in a corresponding process.

In embodiments having two gripper pairs and two corresponding shroud retention devices, the association of a set of shrouds with each retention device may enable the gripper pairs to alternate between machine component insertion and machine component removal.

Gripper pairs and shroud retention devices may be arranged in a variety of configurations. A gripper pair may extend from the movable support structure, relative to another gripper pair or a shroud retention device, in the same direction, in opposite directions, or in skewed directions. A shroud retention device may lie substantially in the same plane as a corresponding gripper pair or in a different plane.

In some embodiments of the invention using a load/unload device, a static winding shroud installation and removal device may be provided to install and remove winding shrouds at one end of a machine component. A multipurpose transfer device, which may perform load/unload functions and shroud retention functions, may be provided to install and remove winding shrouds at the opposite end.

Illustrative examples of embodiments in accordance with the principles of the present invention are shown in FIGS. 1–18.

FIG. 1 shows horizontal plane 8. Horizontal plane 8 may comprise the top face of a metal base structure (resting on floor 9) for supporting and anchoring most of the assembly units that constitute the machinery.

Assembly unit 11 is a winding-termination unit located in position C1 of the horizontal plane for winding coils of wire around the poles of a stator core, like the equipment which has been described in above incorporated U.S. Pat. No. 4,858,835. Assembly unit 11 generally comprises a drive unit 11a for causing needles 11b to move in alternating translational and circular motions. By means of these motions wires are drawn from supply reels 11c and deposited around the poles of the stator core.

Transfer device 12 may carry two stator cores: a first one (not shown) in extremity 12a (shown in FIG. 2) of transfer device 12 and a second one S (shown in FIG. 3) in extremity 12b (shown in FIG. 2) of the transfer device. Stator core holding housings like those described in commonly assigned U.S. Pat. No. 5,207,745, which is hereby incorporated by reference herein in its entirety, and in above incorporated U.S. Pat. Nos. 4,969,606, 4,982,908, and 5,137,221, can be employed in extremities 12a and 12b of the transfer device. These housings may reference or support the stator cores at the winding unit for winding by needles 11b or for other operations that can be performed by transfer device 12. In some embodiments of the invention, stator cores may be secured in the housings by means described below.

Figure 2:
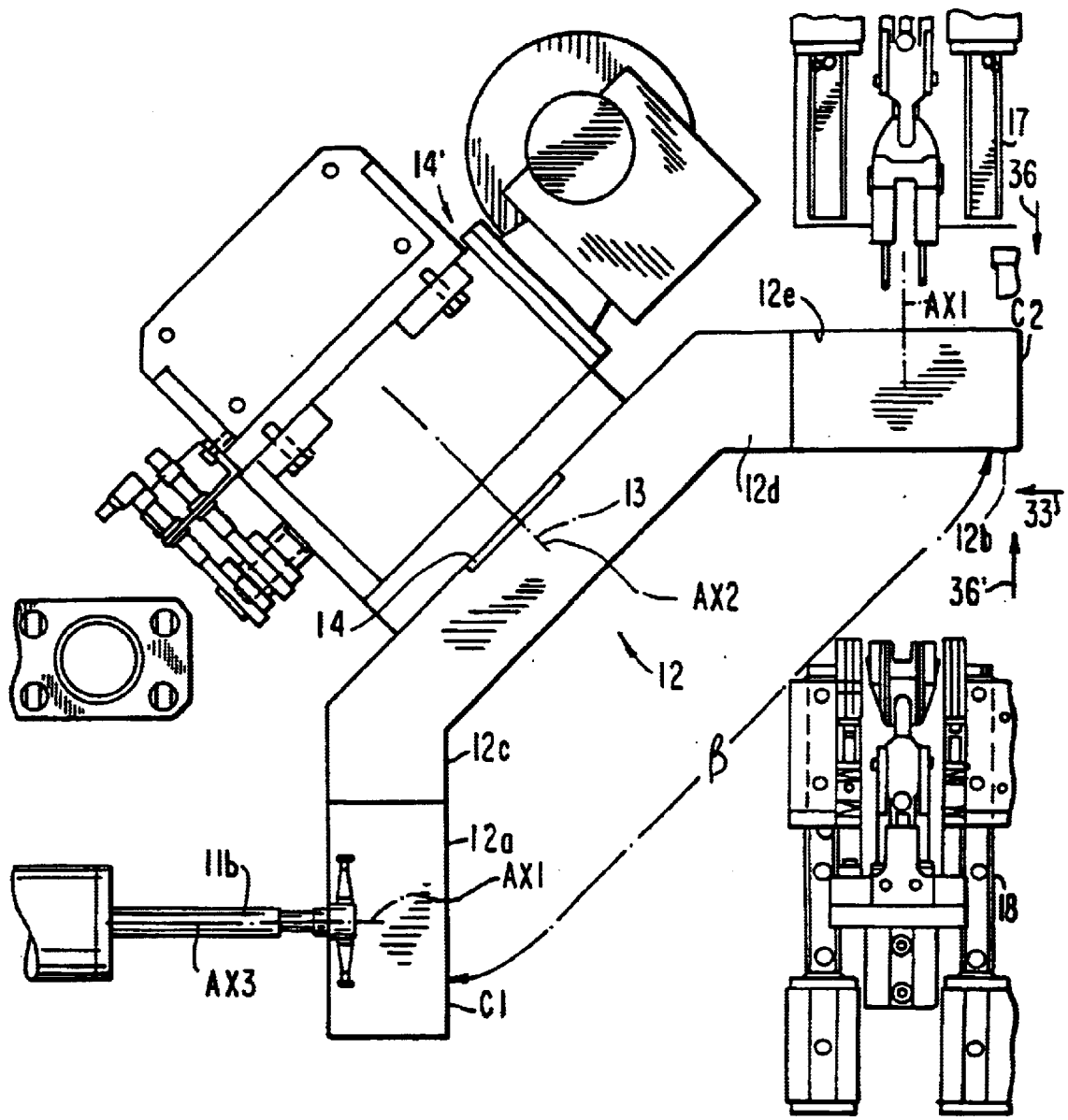
FIG. 2 is an enlarged view of a portion of the system shown in FIG. 1.

FIG. 2 shows that transfer device 12 may have two arm portions 12c and 12d, which may be horizontal and may converge to central area 13 of the transfer device; portion 12c may support a housing in extremity 12a of the transfer device, whilst portion 12d may support a housing in extremity 12b of the transfer device. Angle β between arm portions 12c and 12d may be less than 180°. Central area 13 may be oblique with respect to arm portions 12c and 12d and may be joined to shaft 14 which may be supported and rotated by drive unit 14'.

AX1 (as shown, for example, in FIGS. 1 and 2) illustrates the longitudinal axis of stator cores, as they result when the stator cores are secured to the transfer device. More precisely, AX1 is the axis of the stator core that may coincide with the rotation axes of the rotors that may be driven by the finished stator core.

FIGS. 1 and 2 show that AX2 illustrates the longitudinal axis of shaft 14, around which shaft 14 may rotate. Axis AX3 illustrates the longitudinal axis of needles 11b. Needles 11b translate along axis AX3 to wind the stator core. When the stator core is at position C1, axis AX1 of the stator core may be parallel to axis AX3. Axis AX2 may be oblique with respect to axis AX3.

By rotating shaft 14, portion 12c and portion 12d may exchange themselves at positions C1 and C2 thereby transferring stator cores present in extremities 12a and 12b from position C2 to position C1 and at the same time from position C1 to position C2.

Portions 12c or 12d may find themselves perpendicular to axis AX3 when positioning the stator cores for winding in front of assembly 11 at position C1 (as shown for portion 12c in FIG. 2), and parallel to axis AX3 when positioning the stator cores at position C2 of the horizontal plane (as shown for portion 12d in FIG. 2).

Figure 3:
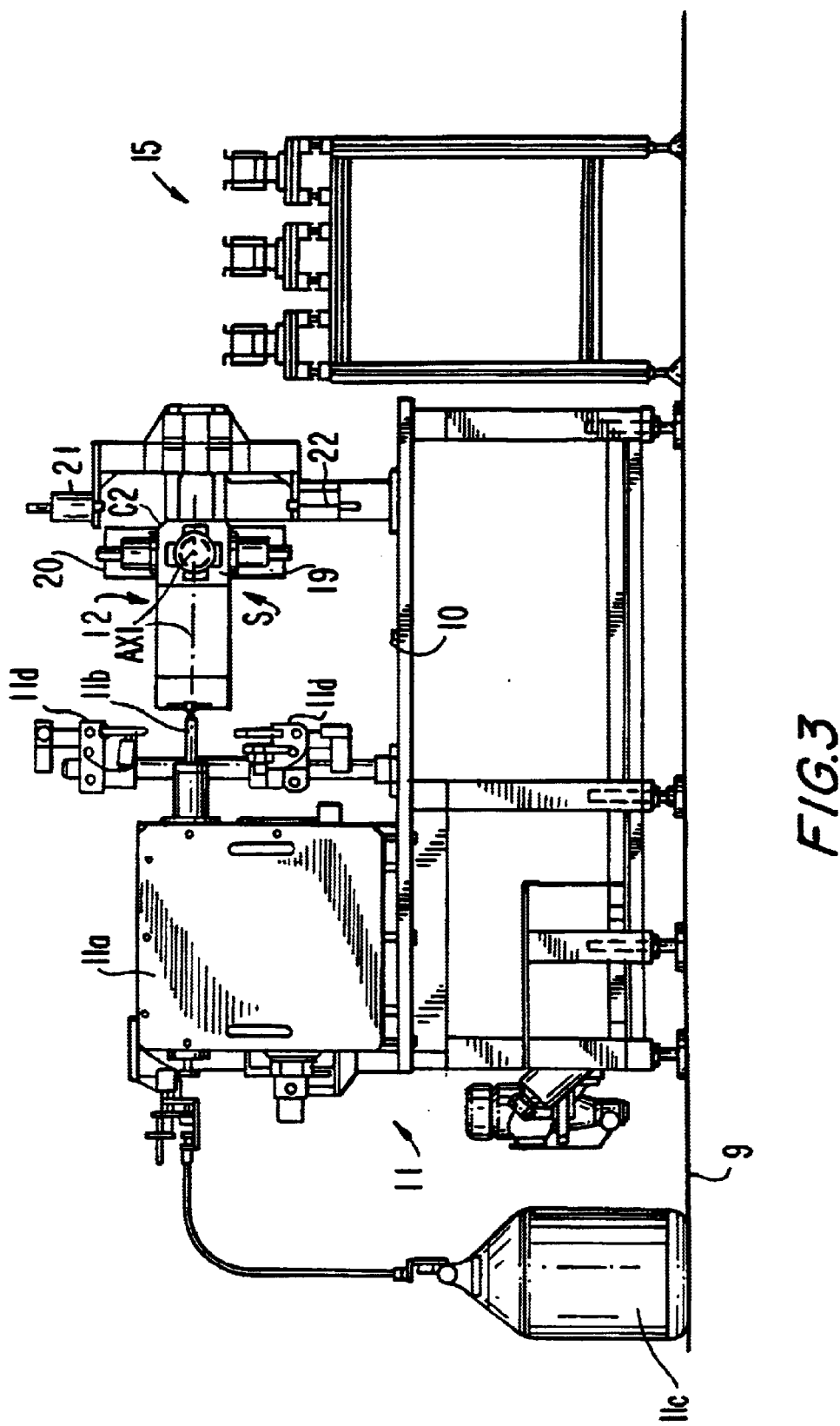
FIG. 3 is an elevational view of the system shown in FIG. 1 taken from line F3—F3 of FIG. 1.

In FIGS. 1–3, extremity 12a has been rendered transparent to show the T tip of needles 11b, as they would appear during translational motion to traverse the stator core positioned at C1. The stator core present in extremity 12a has been omitted for clarity, although its axis AX1 has been shown.

FIG. 3, showing a view taken from line F3—F3 of FIG. 1, shows that lead pulls 11d, like those described in commonly assigned U.S. Pat. Nos. 4,997,138, 5,233,751, and 5,065,503, which are hereby incorporated by reference herein in their entireties, and in above incorporated U.S. Pat. No. 5,207,745, may be located in front of the two ends of the stator core when the latter has been positioned at position C1 for winding by needles 11b. The lead pulls may operate to route and anchor various leads belonging to the coils. In FIG. 3, the lead pulls have been shown only adjacent to the end of the stator which faces drive unit 11a. In FIG. 1, the lead pulls have been omitted for sake of clarity.

FIGS. 1 and 2 show position C2, to which stator cores may be moved between transfer device 12 and pallet conveyor 15. Stator cores to be processed by the machinery may arrive on pallet conveyor 15, adjacent position C2. Load/unload device 16 may collect the stator core to be wound from the pallet conveyor and deposit it into the housing present at position C2. Previously, the same load/unload device may have removed a finished stator core from the housing present at position C2, so that this same housing may be free to receive the stator core to be wound after being collected by the load/unload device. The wound stator core may be deposited by the load/unload device on an empty pallet waiting on pallet conveyor 15. The empty pallet may have previously carried a stator core to be wound by the machinery; such a stator core would be presently at position C1 for winding. FIG. 3 shows the housing at C2 referencing a stator core S to be wound.

FIGS. 1 and 2 show that at position C2, winding shroud mounting devices 17 and 18 may be used to apply shrouds to the stator core. FIG. 3, shows that winding shroud locking devices like 19 and 20 may be mounted on transfer device 12, adjacent to each housing, to maintain the winding shrouds in substantially fixed positions relative to the stator core. The locking devices like 19 and 20 that would be mounted adjacent to the housing present at position C1 have been omitted for clarity. At position C2, actuating devices 21 and 22 (as shown in FIG. 3) may be used to actuate and release the locking devices to lock the winding shrouds to the stator core for transfer to position C1 or to release the shrouds for removing the stator core from the housing (for transfer to pallet conveyor 15, for example)

When the winding shrouds and the locking devices are present in the machinery, the stator cores may be simply supported and referenced by the housings. In this case, the winding shrouds, the mounting devices, and the locking device may be like those described in above incorporated U.S. Pat. No. 4,982,908, and actual securing of the stator core to the housing may occur by securing the winding shrouds to the stator cores. When shroudless winding is performed by the machinery, the winding shrouds, mounting devices, and locking devices may be omitted. In this case, the housings may have internal clamps for securing the stator core to the housing like those described in above incorporated U.S. Pat. No. 4,969,606.

The winding shrouds may also be positioned adjacent position C1. In this case, the previously described internal clamps of above incorporated U.S. Pat. No. 4,969,606 may be used within the housings.

Figure 4:
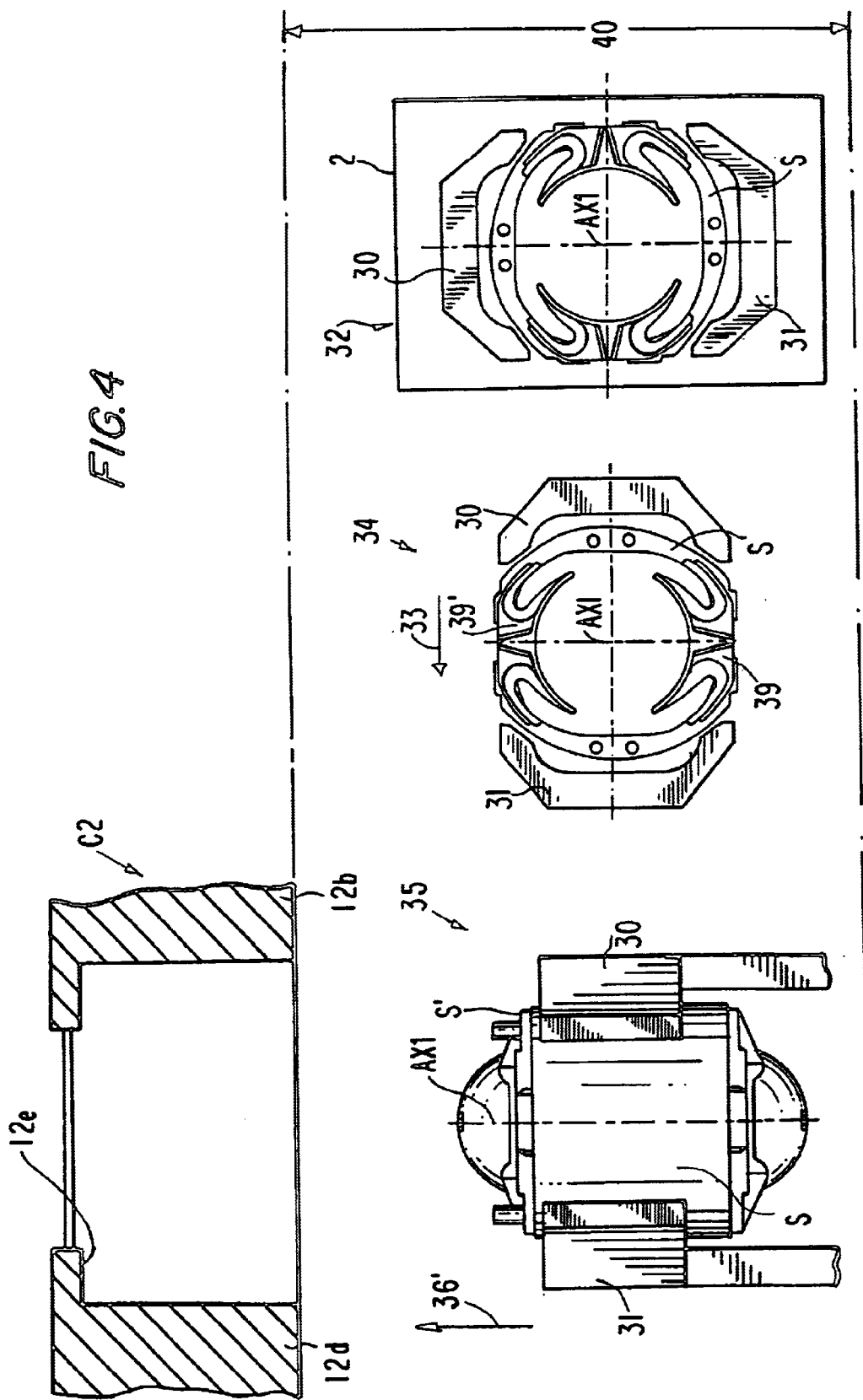
FIG. 4 is a plan view of portions of the system shown in FIG. 1 showing different stages of transferring a stator from a pallet to a stator housing (shown in partial sectional view)

FIG. 4 is a magnified view of area A of FIG. I showing operations that load/unload device 16 may perform to transfer stator cores between a housing in position C2 and pallet 2 present on pallet conveyor 15 (shown in FIG. 1). The load/unload device may be provided with jaws 30 and 31 (the rest of the loading device has not been shown for sake of clarity) for grasping the external surface of stator core S. In position 32, the jaws may descend and grasp a stator core carried by pallet 2. Thereafter, the jaws may move upward so that the stator core clears pallet 2. The jaws may then translate in direction 33 to align the stator core with the housing in position C2. During the translation, the jaws may rotate around axis AX1 of the stator core to orient poles 39 and 39' of the stator core as necessary to position them in the housing at position C2. (See position 34, which shows the jaws rotated and translating in direction 33 to reach alignment with the housing in position C2—the poles of the stator core have been turned, either clockwise or counterclockwise, by 90°.)

At position 35, the stator core housing has been reached, and the jaws may rotate 90° in a plane perpendicular to the plane of FIG. 4 to orient axis AX1 parallel to the plane of FIG. 4 to orient the stator as required for the housing to receive the stator. Thereafter, the jaws can translate toward the plane of FIG. 4 and in direction 36' (shown also in FIG. 1) to insert the stator core into the housing.

Referencing of the stator core in the housing may occur by abutment of the end face S' of the stator core against a face 12e of the housing. Corridor 40, where translation of the jaws between positions 32 and 35 may occur, is located between winding shroud mounting device 18 and portions of transfer device 12 present in position C2. If corridor 40 is not wide enough, translation of the jaws may occur at a different elevation from shroud-mounting device 18. In this case, shroud mounting device 18 may be provided with a mechanism to move it out of the plane containing FIGS. 1 and 2 (to allow the jaws to translate above or below the mounting device) and to return it back into the plane containing FIG. 1 and 2 after the jaws have been moved out of the way.

The shrouds may be applied to the stators by moving shroud mounting devices 17 and 18 in directions 36 and 36', respectively. These directions are parallel to axis AX1 of the stator core, when the latter is referenced and supported within the housing present in position C2. FIG. 3 shows stator S referenced and positioned in the housing present at position C2. As illustrated, axis AX1 of stator S in the housing present at C2 is perpendicular to the page containing FIG. 3. Some embodiments of the invention may include a smaller dimension X (as shown in FIG. 1), than that of traditional machines. This is particularly due to the configuration of transfer device 12 which has portions 12c and 12d at angle β, which is less than the 180° angle that traditional machines have.

Access of the operator to shroud mounting devices 17 and 18 may be better than that in traditional machines, because such access may occur from sides Y and Z of the machine (as shown in FIG. 1). In traditional machines, the shroud mounting devices are located at 90° with respect to those of the machine described herein, therefore access to the shroud mounting devices is rather from front and rear sides W and R. Cabinet 137, for locating electrical or electronic equipment of the machinery, may be located near corner C of plane 8. To render the machinery more compact, a portion of corner C of plane 8 may be cut out to receive cabinet 137. This would render the machine even more compact, in regard to dimension X, because the cabinet width b (or a portion of it) would be contained in dimension X.

FIGS. 5–9 show features of an exemplary winding shroud locking device that may be included in some embodiments of the invention. In some of these embodiments, the device may be located in a position (relative to transfer device 12 as shown in FIG. 3) equivalent to the positions of devices 19 and 20 shown in FIG. 3. Thus, the view shown in FIG. 5 may be in the same direction as that shown in FIG. 3.

Figure 5:
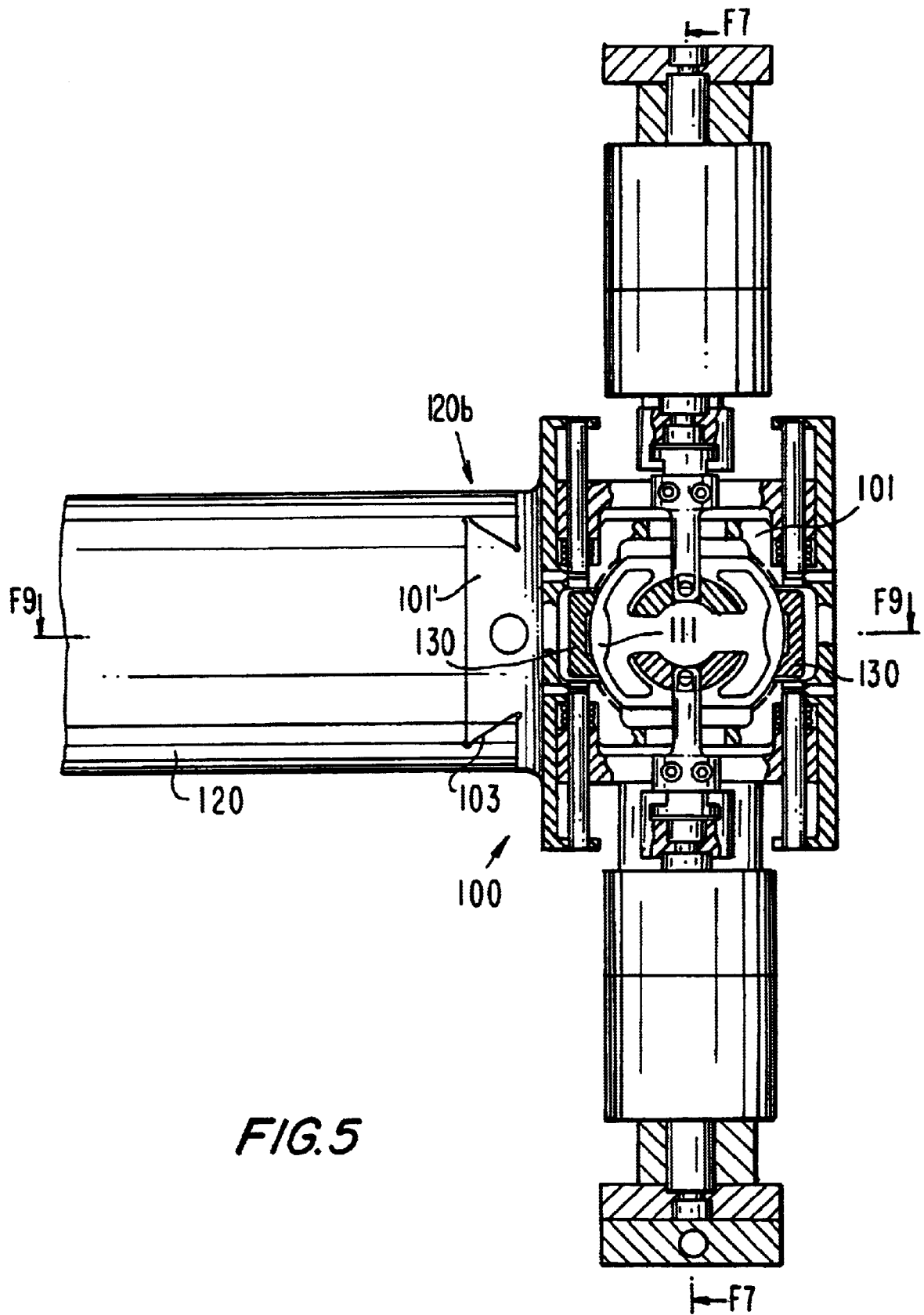
FIG. 5 is a partial sectional view (wherein hatching indicating section portions has been partially omitted for the sake of clarity) of an illustrative shroud locking device in accordance with the principles of this invention.
Figure 6:
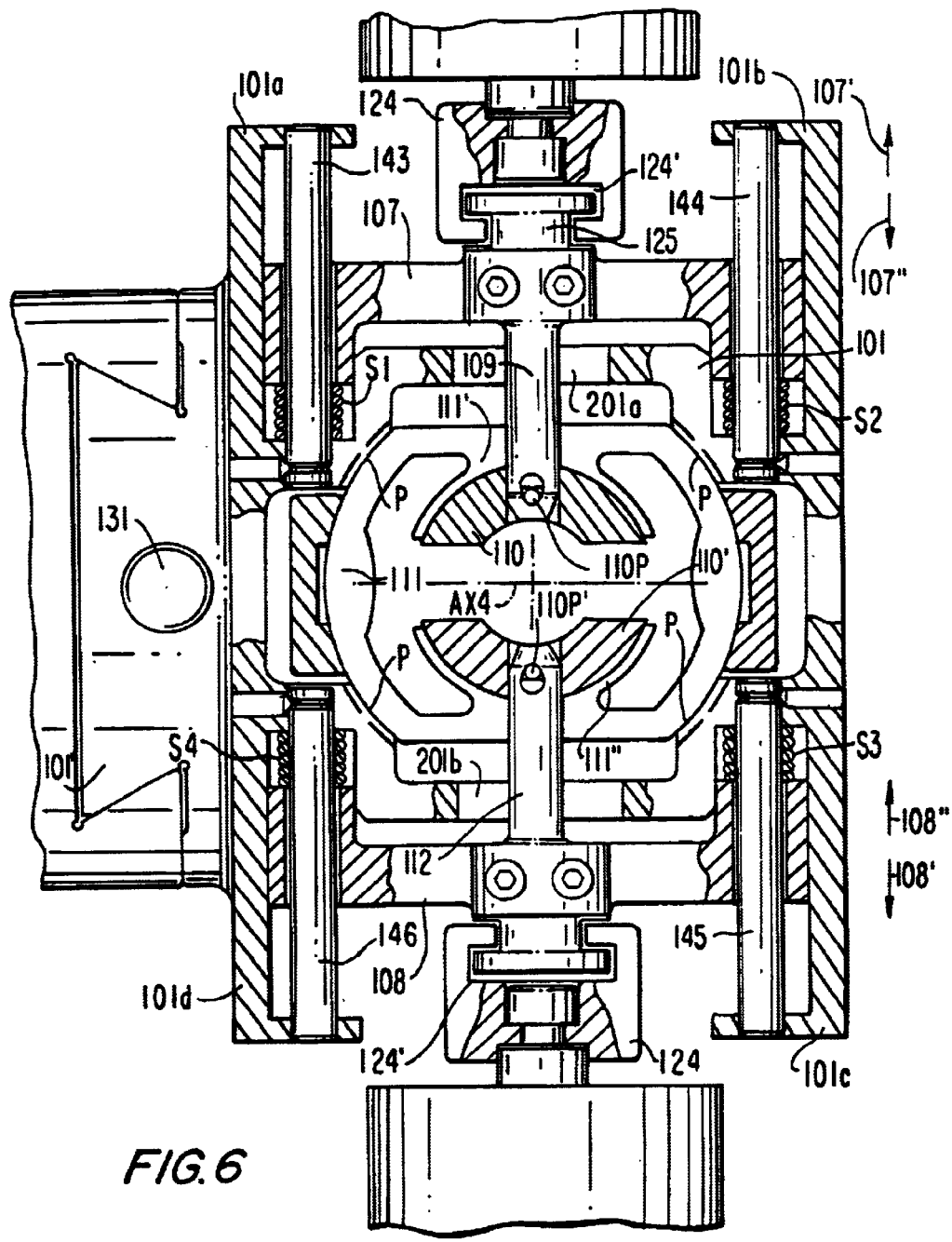
FIG. 6 is an enlarged view of a portion of the shroud locking device shown in FIG. 5.

FIG. 5 shows housing 100 located in an extremity of transfer device 120 (FIGS. 5 and 6 show housing 100 in extremity 120b of the transfer device). Housing 100 may comprise two seat plates 101 and 102. (Seat plate 102 is shown behind seat plate 101 in FIGS. 7–9). Each seat plate may have a dovetail guide portion (dovetail guide portion 101' for seat plate 101, and dovetail guide portion 102' for seat plate 102). The guide portions may be received in groove 103 machined across the extremities of the transfer devices. Seat plate 101 may be provided with columns 101a, 101b, 101c and 101d (see FIG. 6). The columns may be symmetrically located on the seat plate to support guide bars like 143, 144, 145 and 146 (as shown in FIG. 6). The guide bars may be secured to the support plate by screws or any other suitable means.

Carriage 107 may be assembled on guide bars 143 and 144 to move in directions 107' and 107" when required. Carriage 108, which may be opposite carriage 107, may be assembled on guide bars 145 and 146 to move in directions 108' and 108" when required.

Locking blade 109 may be fixed to carriage 107 by bolts (shown, but not numbered), or any other suitable means, for locking shroud 110 adjacent to one end of first pole 111' of stator 111.

Locking blade 112 may be fixed to carriage 108 by bolts (shown, but not numbered) for locking shroud 110I to one end of second pole 111" of stator 111. The related ends of poles 111' and 111" where shrouds 110 and 110' are locked adjacent to the poles are shown in FIGS. 5 and 6.

Figure 8:
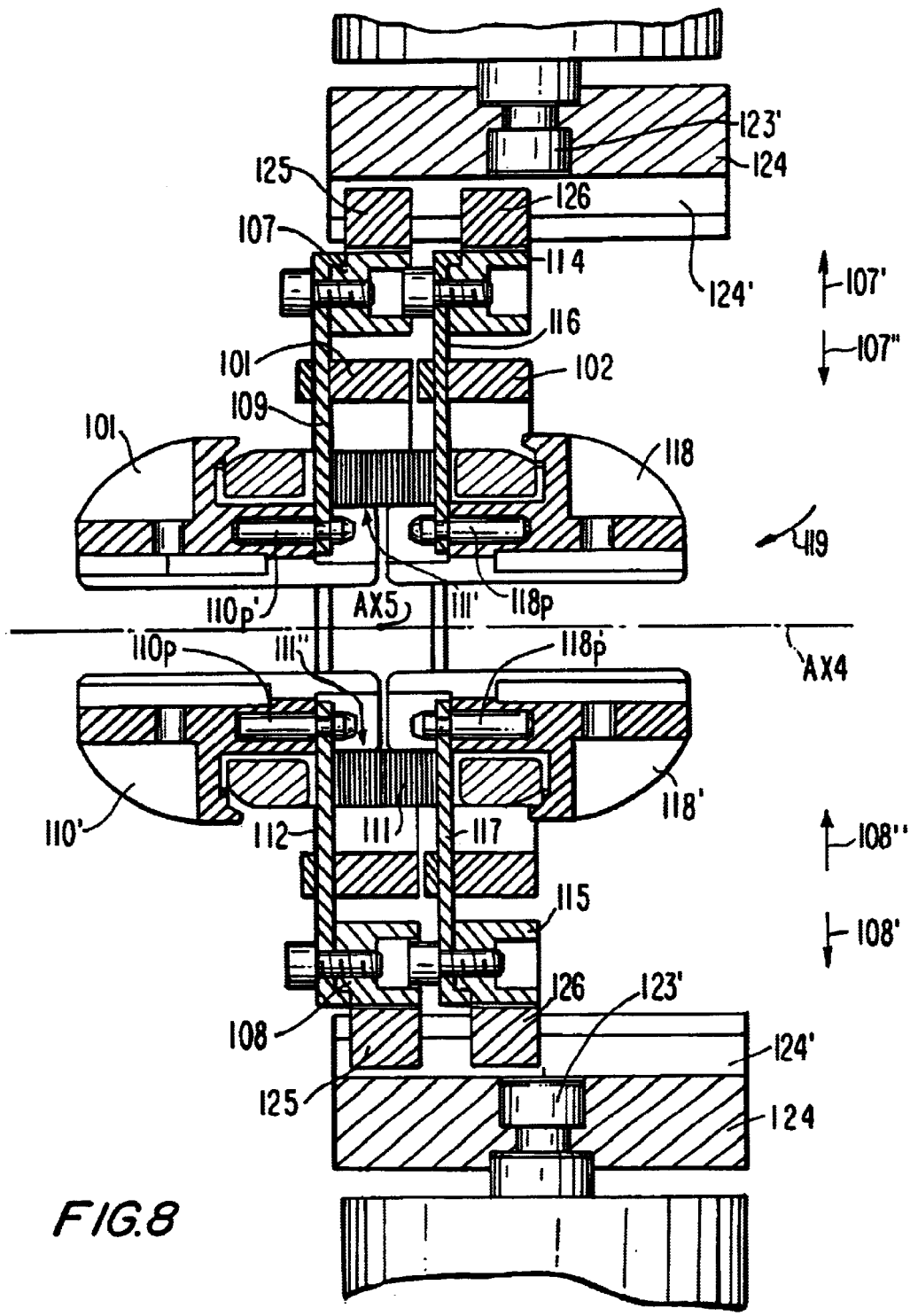
FIG. 8 is an enlarged view of a portion of the view shown in FIG. 7.

FIG. 8 shows that seat plate 102 may be provided with carriages 114 and 115, to which locking blades 116 and 117, respectively, may be fixed. Carriages 114 and 115 may be like carriages 107 and 108, and may be mounted on guide bars (like 143, 144, 145 and 146, but not shown) which may be supported by columns (like 101a, 101b, 101c and 101d, but not shown) mounted on seat plate 102. Carriages 114 and 115 may move in directions 107' and 107" as required.

Preloaded springs S1 and S2 may be assembled between carriage 107 and seat plate 101, around guide bars 143 and 144, respectively, as shown in FIG. 6. Springs S1 and S2 may push carriage 107 in direction 107' by means of their preload. Similarly, springs S3 and S4 may be assembled between carriage 108 and seat plate 101, respectively around guide bars 145 and 146. Springs S3 and S4 may push carriage 108 in direction 108' by means of their preload.

Carriages 114 and 115 may be pushed in directions 107' and 108', respectively, by springs (like S1, S2, S3, S4, but not shown) present on seat plate 102.

As shown in FIG. 8, shrouds 118 and 118' may be locked by locking blades 116 and 117, respectively, adjacent poles 111' and 111", respectively, at end 119 of stator 111. Locking of the shrouds may occur by engaging the inside faces of openings (shown, but not numbered) of the locking blades against pins 110P, 110'P, 118P, and 118'P.

Pins 110P, 110'P, 118P, and 118'P may be present within shrouds 110, 110' 118, and 118', respectively. Secure locking of the shrouds may be achieved by pulling locking blades 109 and 116 in directions 107' and by pulling locking blades 112 and 117 in directions 108'. This may pull portions of the shroud surfaces against the inside surfaces of the poles. The springs for pushing the carriages in directions 107' and 108' may keep the shrouds locked against the inside surfaces of the poles.

The locking blades may pass through apertures of the seat plates and of the stator in order to engage the pins of the shrouds. FIG. 6 shows apertures 201a and 201b of seat plate 101, through which locking blades 109 and 112 may pass, respectively, to reach the pins of the shrouds. Similar apertures may be present on seat plate 102.

Figure 7:
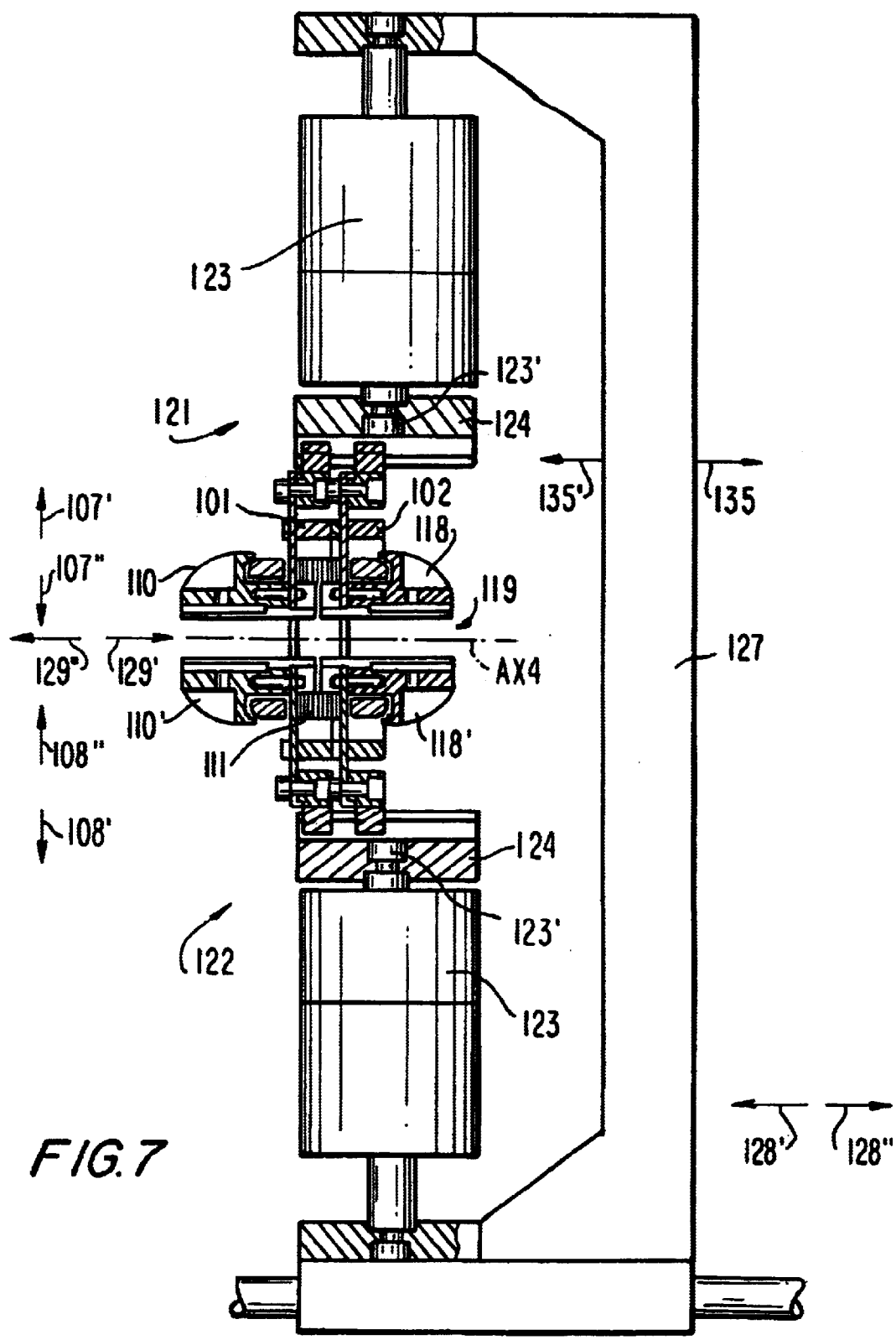
FIG. 7 is a partial sectional view (wherein hatching indicating section portions has been partially omitted for the sake of clarity) of the shroud locking device shown in FIG. 5 taken from line F7—F7 of FIG. 5.

FIG. 7 shows assemblies 121 and 122, which may be used to release shrouds 110 and 118 and shrouds 110' and 118', respectively, so that the stator can be removed from the housing (as is required when unloading a wound stator from housing 100 and replacing it with another stator to be wound). Assembly 121 comprises an air cylinder drive 123 capable of performing at least three position stops along its stroke (for example, two end positions and an intermediate position). Shaft end 123' of air cylinder drive 123 may be fixed to actuating bar 124.

FIG. 8 shows that actuating bar 124 may be provided with corridor 124'. In some embodiments of the invention, corridor 124' may be an internal T-shaped corridor. Corridor 124' may receive correspondingly shaped T appendages 125 and 126 of carriages 107 and 114. Once the T appendages are received in corridor 124', actuating bar 124 can be moved in directions 107' or 107" by pressurizing air cylinder drive 123. More precisely, movement of the actuating bar in direction 107' will move carriages 107 and 114 together in direction 107' and movement of actuating bar in direction 107" will move carriages 107 and 114 together in directions 107".

When drive 123 is configured at the end position of the stroke in direction 107", actuating bar 124 causes the carriages to compress the springs, which were previously causing the locking blades to act on the pins. The end position of the stroke corresponds to unlocking of shrouds 110 and 118, and may allow them to be removed from the stator. After the shrouds have been removed from the stator, air cylinder 123 may be configured in the opposite end position of the stroke (in direction 107') to completely remove locking blades 109 and 116 from the stator. Stator 111 can then be freely unloaded from the housing and replaced with another stator that needs to be wound.

The structure and function of assembly 122 may be similar those of assembly 121. The same reference numerals have been used for parts of assembly 122 that are identical to those of assembly 121. Assembly 122 accomplishes movements in directions 108' and 108" to lock, release, withdraw, and reinsert locking blades 116 and 117.

The only difference between assembly 121 and 122, is that assembly 122 needs to move its actuating bar 124 in direction 108', when assembly 121 moves its actuating bar 124 in direction 107', and in direction 108" when assembly 121 moves its actuating bar in direction 107". The operating conditions described for assembly 121 at the position of the end of the stroke in direction 107' may be identical and simultaneous to the operating conditions for assembly 122 at the position of the end of the strokes in direction 108'.

Similarly, the operating conditions described for assembly 121 at the position of the end of the stroke in direction 107" may be identical and simultaneous to the operating conditions for assembly 122 at the position of the end of the stroke in directions 108".

Assemblies 121 and 122 may be mounted on carriage 127 (as shown in FIG. 7) so that they can be moved together in directions 128' and 128" by a carriage actuator (not shown). Movement in direction 128", for example, may cause corridors 124' of actuating bars 124 to come away from receiving appendages 125 and 126. This movement may occur with air cylinder drives 123 in the intermediate position of their stroke, when the locking blades are securing the shrouds by means of the preloaded springs. In this condition, appendages 125 and 126 may be positioned by the spring action on the shroud pins. The intermediate position of the stroke may leave space between the appendages and corridors 124' to allow corridors 124' to move in direction 128". This procedure may be used, for example, to lock the shrouds and allow a transfer device, such as transfer device 120, to transfer the stator to a winder.

The intermediate position of the stroke may be used when carriage 127 is moved in direction 128' to cause corridors 124' to receive the appendages. The appendages may be received to release the locking blades. This procedure may be used, for example, to unlock locking blades after transfer device 120 transfers a wound stator from the winder to the shroud locking device.

In some embodiments of the invention, jaws 130 (as shown in FIG. 5), which may be equivalent to opposing jaws 30 and 31 shown in FIG. 4, may be used to grip the stator in order to accomplish the insertion or removal of the stator with respect to the housing. Jaws 130 may move the stator in direction 129' (as shown in FIG. 7) to insert the stator in the housing. Jaws 130 may move the stator in direction 129" to remove the stator from the housing. FIG. 5 shows that seat plate 101 may be conformed to receive jaws 130 and to allow them to release themselves from the stator. Seat plate 102 may be similarly conformed. When the stator is inserted in the housing, it may be coaxial with housing axis AX4, as shown in FIGS. 6–8. Portions P of seat plate 101 may be used as reference and abutment surfaces to maintain the stator centered on axis AX4. Corresponding portions of seat plate 102 may be used in a similar fashion.

Figure 9:
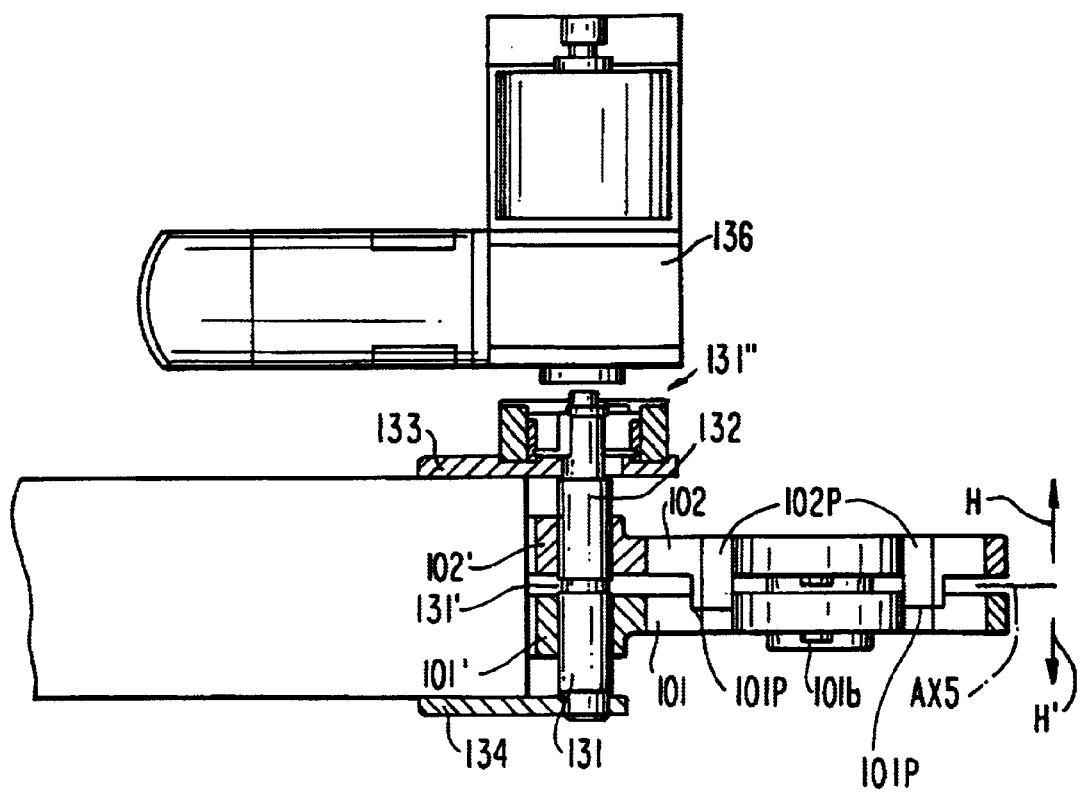
FIG. 9 is a partial sectional view of the shroud locking device shown in FIG. 5, taken from line F9—F9 of FIG. 5, wherein certain portions of FIG. 5 have been omitted for the sake of clarity.

FIG. 9 shows that in some embodiments of the invention seat plate 102 may have overlapping portions 102P received in seats 101P of seat plate 101. Portions 102P may provide support for one end of a stator inserted in the housing. The overlapping feature of portions 102P and 101P may allow the locking blades of seat plate 101 to be spaced a short distance apart from the locking blades of seat plate 102 when, for example, the stator is short in the direction of AX4. For short stators, the overlapping feature may provide a continuous support surface in the housing.

Dovetail guide portion 101' and corresponding portion 102' (for seat plate 102) may be engaged, respectively, by threaded portions 131 and 132 of bar 131'. The threaded portions may be oppositely threaded with respect to each other so that turning of bar 131' will move seat plates 101 and 102 either towards each other or away from each other, depending on the rotation direction used to turn bar 131'.

Bar 131' may be supported by opposite plates 133 and 134 of transfer device 120. Extreme 131" of bar 131' may have a tooth coupling that can be used to lock bar 131' in order to secure seat plates 101 and 102 at a desired distance from each other.

Pusher and motor unit 136, which may be supported by a frame member of the machine, may be used to release the tooth coupling and thereafter move seat plates 101 and 102 to a different distance from each other. Unit 136 may be capable of releasing and locking the tooth coupling and becoming connected or disconnected with respect to bar 131'. The motor of unit 136 may turn bar 131' after a connection has been made and the tooth coupling has been released.

The spacing between the seat plates may be adjusted so that stators of different stack heights can be appropriately supported. As the spacing between the seat plates is changed, the spacing between locking blades may also change, as would be required to accommodate stators of different stack heights.

Differences in stator stack heights may correspond to symmetric extensions of the stator in opposite directions H and H' with respect to middle axis AX5. Therefore, in some embodiments of the invention, dovetail portions 101' and 102' may be threaded onto portions 131 and 132 of bar 131' so that they are positioned symmetrically with respect to middle axis AX5. The stator may be positioned with respect to the seat plates (by jaws 130, for example) so that the stator is substantially centered on axis AX5.

In some embodiments of the invention, axis AX5 will be substantially centered on the midpoint of the translational stroke of the wire dispensing needles when the transfer device moves the housing to the winder. By centering a stator on axis AX5 and centering axis AX5 on the midpoint of the translational stroke of the wire dispensing needles, the need for needle substitution, as discussed in above incorporated U.S. Pat. No. 5,207,745, may be avoided. Corridors 124' may be long enough in directions 135 and 135' (shown in FIG. 7; parallel to directions 128' and 128") to receive both appendages 125 and 126 when the spacing between them changes in response to changes in the spacing between seat plates 101 and 102.

In FIGS. 7 and 8, actuating bars 124 have been shown in a condition when they are moving in directions 128' or 128". When used to actuate the locking blades, the actuating bars may be positioned so that shaft end 123' is centered with respect to middle axis AX5. Thereafter the air drive units may proceed to operate as described above.

FIGS. 10–13 show features of an exemplary stator core housing with integrated features that may be provided in some embodiments of the invention.

Figure 10:
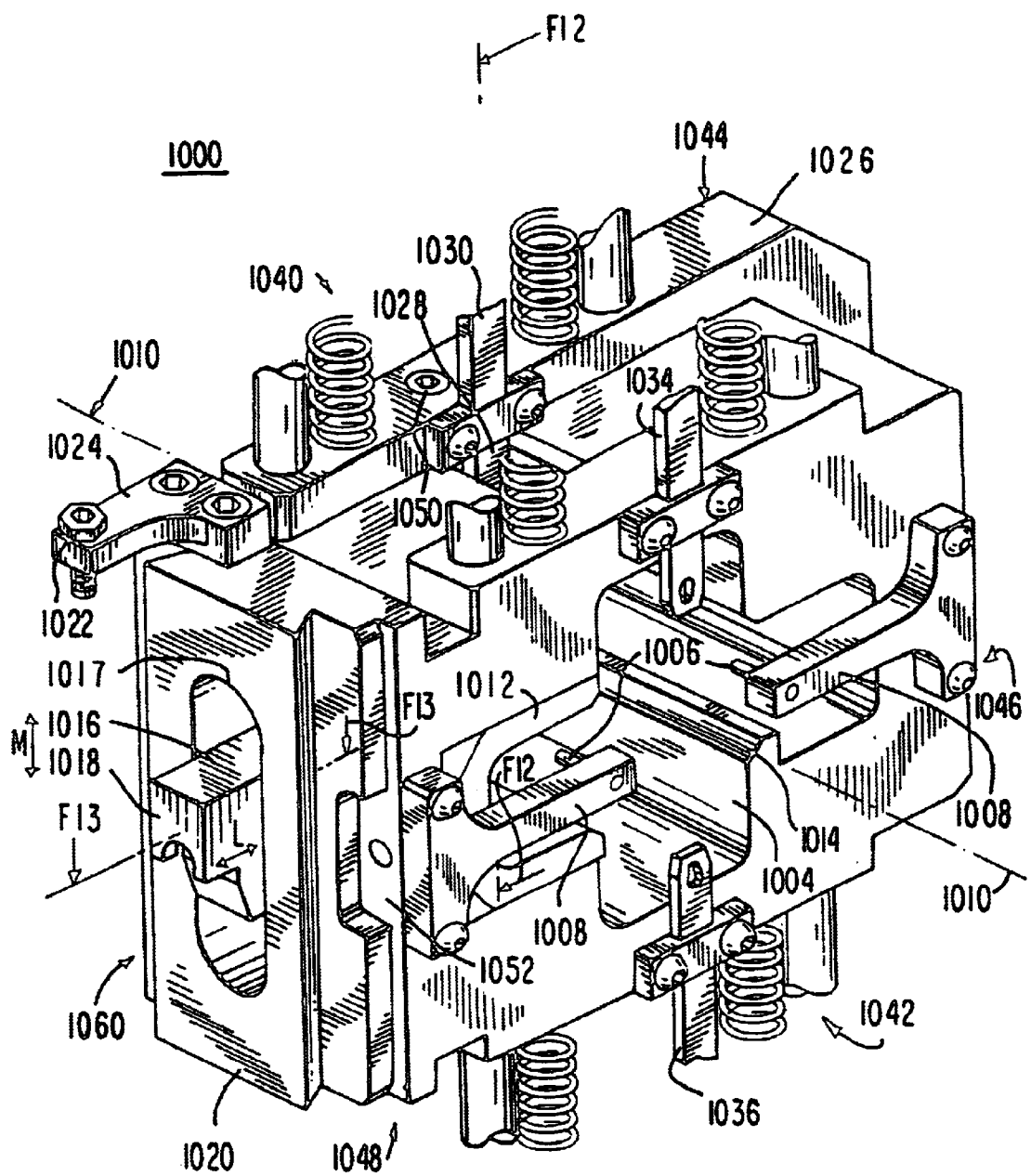
FIG. 10 is a perspective view of an illustrative machine component housing in accordance with the principles of this invention.

FIG. 10 shows exemplary stator housing 1000. Housing 1000 may be used to position a stator at an assembly station of a winding machine (for example, a stator winder or a coil termination device). Housing 1000 may be used in conjunction with rotating transfer devices such as those described in above incorporated U.S. Pat. No. 4,969,606, which include rotating transfer tables configured to support four housings.

A stator may be inserted from back 1040 of housing 1000 in a direction parallel to central axis 1010 into cavity 1004, for example, by using a load/unload device as described below. Referencing posts 1006 may extend into cavity 1004 from axial reference members 1008 to provide surfaces for abutment against the face of a stator being inserted into housing 1000.

Clamp 1012 may be used to brace or clamp a stator against an opposing internal surface such as surface 1014, or another internal housing surface or surfaces. A second clamp member, opposite clamp 1012, may also be provided (not shown). Clamp 1012 may be actuated by reciprocating clamp stem 1016 with respect to axis 1010 (for example, along arrow L). Fork appendix 1018 may be used to releasably link stem 1016 to other actuating members, some of which may be external to housing 1010. Stem 1016 may project through opening 1017 in dovetail 1020 on housing side 1060.

Dovetail 1020 may inserted in a complementary groove in a transfer device or other support member to removably secure housing 1000. Screw 1022, threaded through height adjustment member 1024, may be provided for referencing housing 1000 in a direction perpendicular to central axis 1010 (for example, along arrow M). When dovetail 1020 is inserted into a mounting groove, for example, on a winding machine rotating transfer member, screw 1022 may be set to abut a referencing surface of the transfer member at a preselected height. Slit 1052 adjacent dovetail 1020 may be engaged by a safety catch extending, for example, from the rotating transfer member, to prevent housing 1000 from slipping off the transfer member if a primary mounting mechanism (the dovetail and corresponding groove, for example) is left unsecured.

Dovetail 1020 is one example of a housing mounting mechanism that engages only one side of housing 1000. This approach may leave the other sides available for accessing or interacting with the stator. For example, back 1040 may be used for inserting and removing a stator and front 1042 may be used for winding or terminating coils. Top 1044, right side 1046, and bottom 1048 may be provided with an integrated shroud locking mechanism.

Some embodiments may include a sliding frame, such as U-shaped frame 1026, for supporting shroud locking blades. Frame 1026 may extend along top 1044, right side 1046, and bottom 1048 of housing 1000. Frame 1026 may slide along outer portions of housing 1000 in a direction parallel to central axis 1010. On top 1044 frame 1026 may be guided by guide slot 1028. On bottom 1048 frame 1026 may be guided by a corresponding slot (not shown) along bottom 1048.

Shroud locking blades mounted on frame 1026, such as shroud locking blade 1030 that extends into interior cavity 1004 from top 1044, may traverse along the length of housing 1000 as frame 1026 moves. A complementary locking blade (such as 1032 shown in FIG. 11) may be supported by a portion of frame 1026 that extends along bottom 1048 of 1000. The complementary blade may extend up from frame 1026 into the interior cavity 1004.

When a stator is supported by housing 1000, locking blades attached to frame 1026 may be used to secure winding shrouds to an end of the stator adjacent back 1040 of housing 1000. Fixed or static locking blades 1034 and 1036 may be provided to secure winding shrouds to an end of the stator adjacent front 1042 of housing 1000. By sliding frame 1026, therefore, front and rear shroud locking may be provided for stators of different lengths using housing 1000. Fixing screw 1050 may be used to secure frame 1026 at a location along slot 1028.

Figure 11:
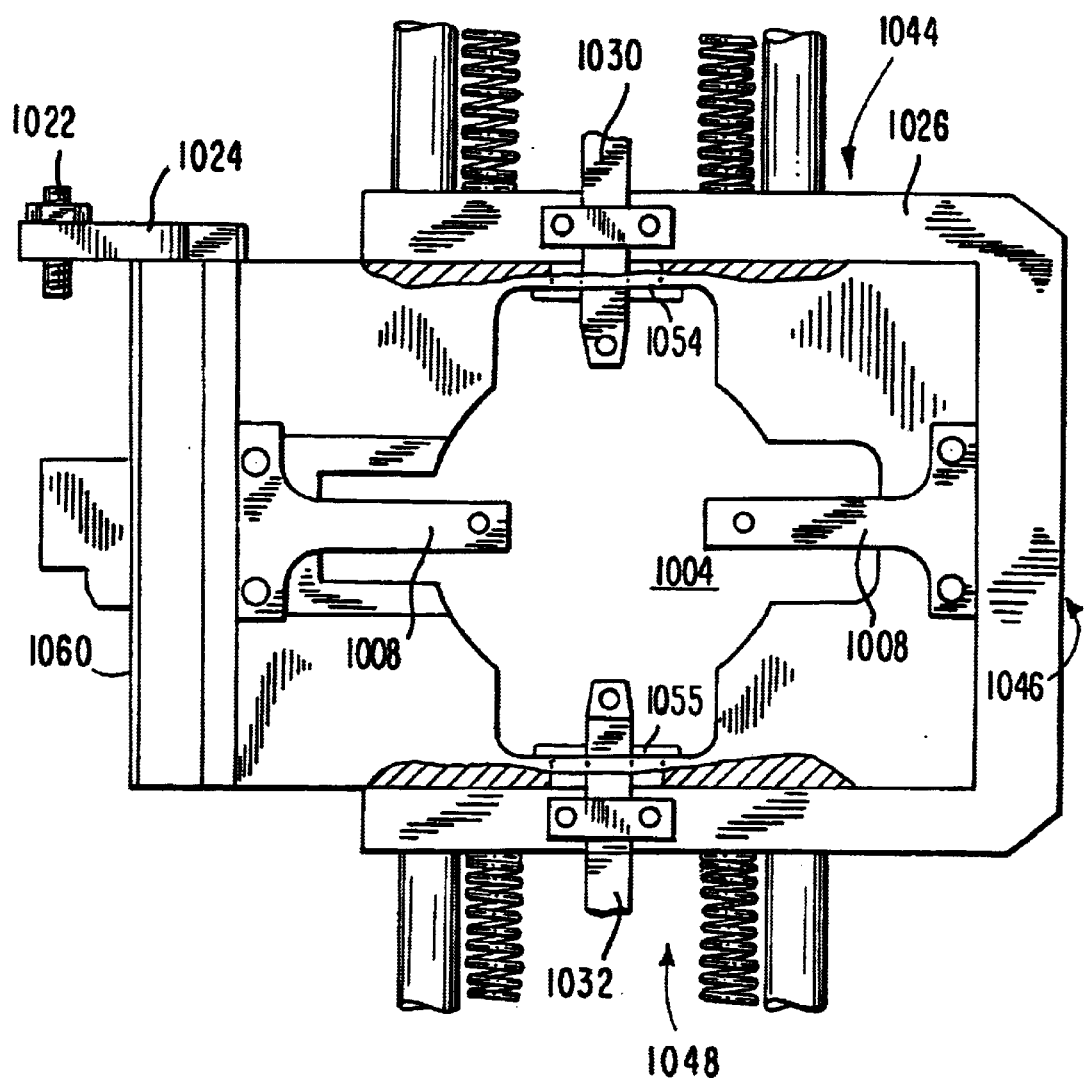
FIG. 11 is a simplified front elevational view of portions of the housing shown in FIG. 10.

FIG. 11 is a front view of housing 1000, but some features, such as static shroud locking blades 1034 and 1036, have been removed to provide a view of frame 1026 extending along top 1044, side 1046, and bottom 1048 and supporting top locking blade 1036 and bottom locking blade 1032, that extend into housing interior 1004. FIG. 11 shows "T"-nuts 1054 and 1055 that may slide in top and bottom guide slots, respectively. The "T"-nuts may be threaded onto screws such as 1050 to guide frame 1026 along the slots. The nuts may be tightened in the slots using the screws to secure frame 1026 in a selected position.

Figure 12:
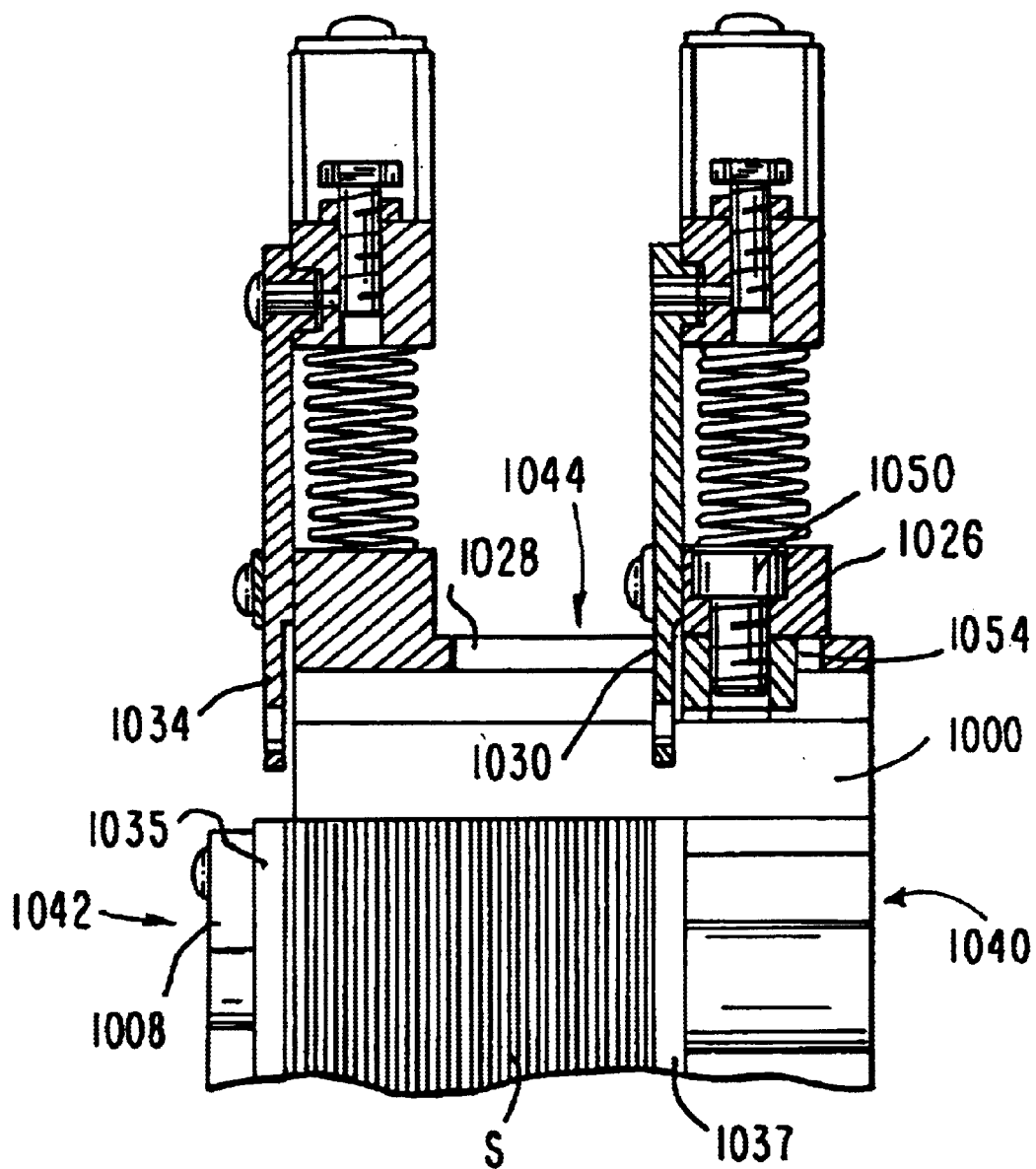
FIG. 12 is a partial sectional view of the housing shown in FIG. 10 taken from line F12—F12 of FIG. 10.

FIG. 12 is a partial sectional view of a portion of housing 1000, taken from line F12—F12 of FIG. 10, showing top static locking blade 1034 and top sliding locking blade 1030 in retracted positions. A corresponding bottom static blade and bottom sliding blade are not shown. Stator S has not been shown in sectional view for the sake of clarity. Locking blades 1034 and 1030 may be inserted into the interior of housing 1000 to engage winding shrouds that may be inserted in stator S abutting reference member 1008. FIG. 12 shows blades 1034 and 1030 aligned with end plates 1035 and 1037, respectively. Channels (not shown), which may be located, for example, behind stator end plates 1035 and 1037 in FIG. 12, may pass through the body of stator S to enable locking blades 1034 and 1030 to engage shroud locking pins within interior 1004. Frame 1026 may be moved along slot 1028 to achieve alignment of locking blades with passages of a stators of different sizes. Fixing screw 1050, passing through slot 1028, may be tightened using nut 1054 to secure frame 1026 in position.

Figure 13:
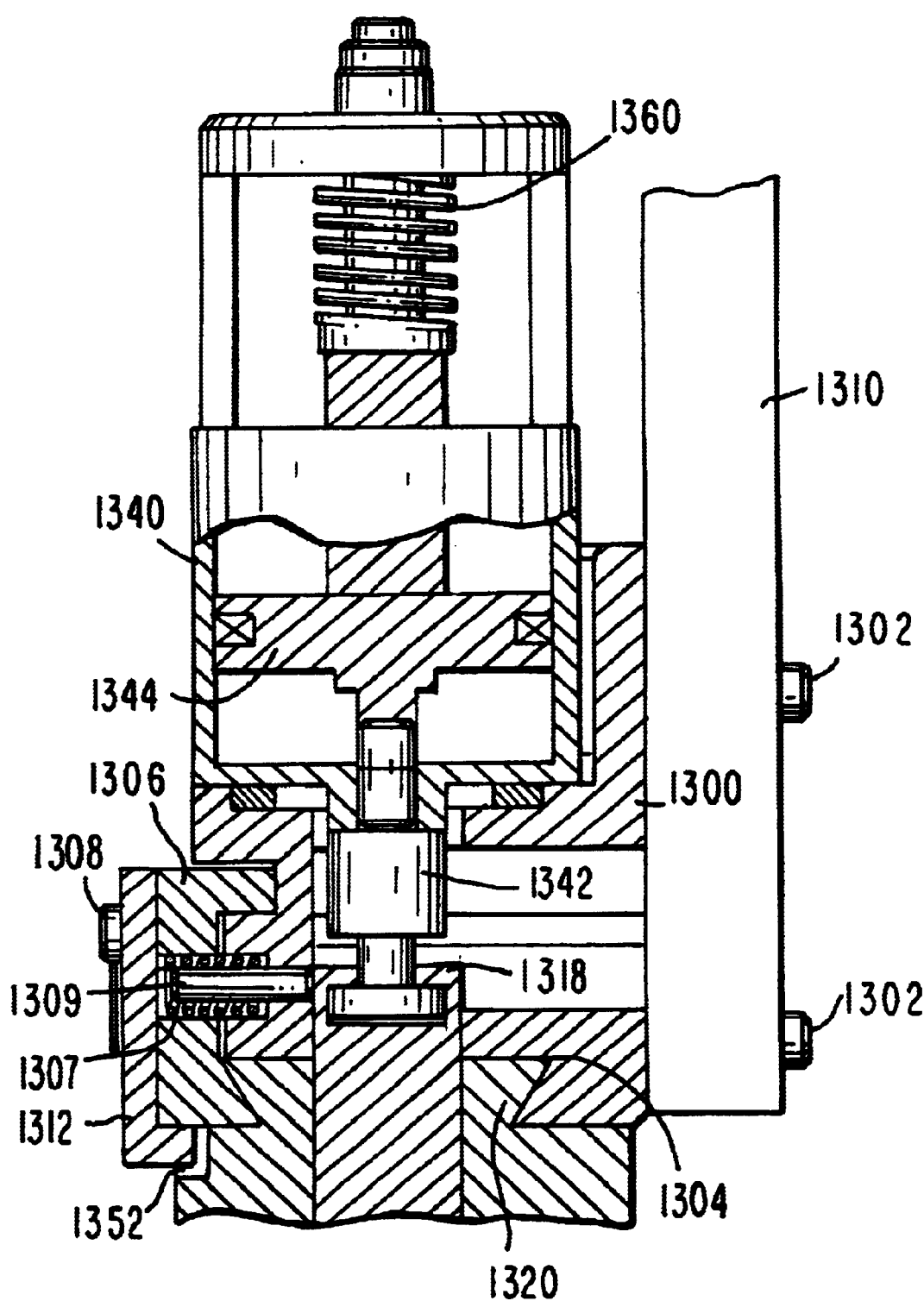
FIG. 13 is a partial sectional view of an attachment member in accordance with the principles of this invention from line F13—F13 of FIG. 10.

FIG. 13, a view taken from line F13—F13 of FIG. 10, is a partial sectional view of apparatus that may be used to secure a housing such as 1000 to a transfer device or to actuate a stator clamp such as 1012. FIG. 13 shows attachment member 1300 attached to arm 1310 of a transfer device for transferring stators between stations of a winding apparatus. In some embodiments, attachment member 1300 may be fastened to arm 1310 by bolts 1302. Attachment member 1300 may comprise steel. Arm 1310 may comprise aluminum. Groove 1304 in attachment member 1310 may accept a dovetail from a housing such as 1000 (shown in FIG. 10). A spring-biased clamp may be used to secure dovetail 1320. For example, dovetail clamp 1306 may form a portion of groove 1304. Screw 1308, opposed by biasing spring 1307, may be used to tighten clamp 1306, guided by pin 1309, against dovetail 1320. Safety catch 1312 may be provided for engaging a housing at slit 1352 if the primary housing mounting mechanism is left unfastened.

In some embodiments, air cylinder 1340 may be provided to actuate or apply force to a stator clamp such as clamp 1012 (as shown in FIG. 10). For example, air cylinder 1340 may drive "T"-connector 1342, which may be engaged with fork appendix 1318. Fork appendix 1318 may in turn be attached to clamp 1012 inside a housing such as 1000 (as shown in FIG. 10).

In some of these embodiments, piston 1344 of air cylinder 1340 may be biased by spring 1360 to provide backup force to a stator clamp if air cylinder 1340 inadvertently depressurizes. In some embodiments, clamp 1012 may be actuated by a spring or springs without an air cylinder. Some embodiments may provide an air cylinder or air cylinders without springs. Springs and/or air cylinders may be arranged in parallel.

Figure 14:
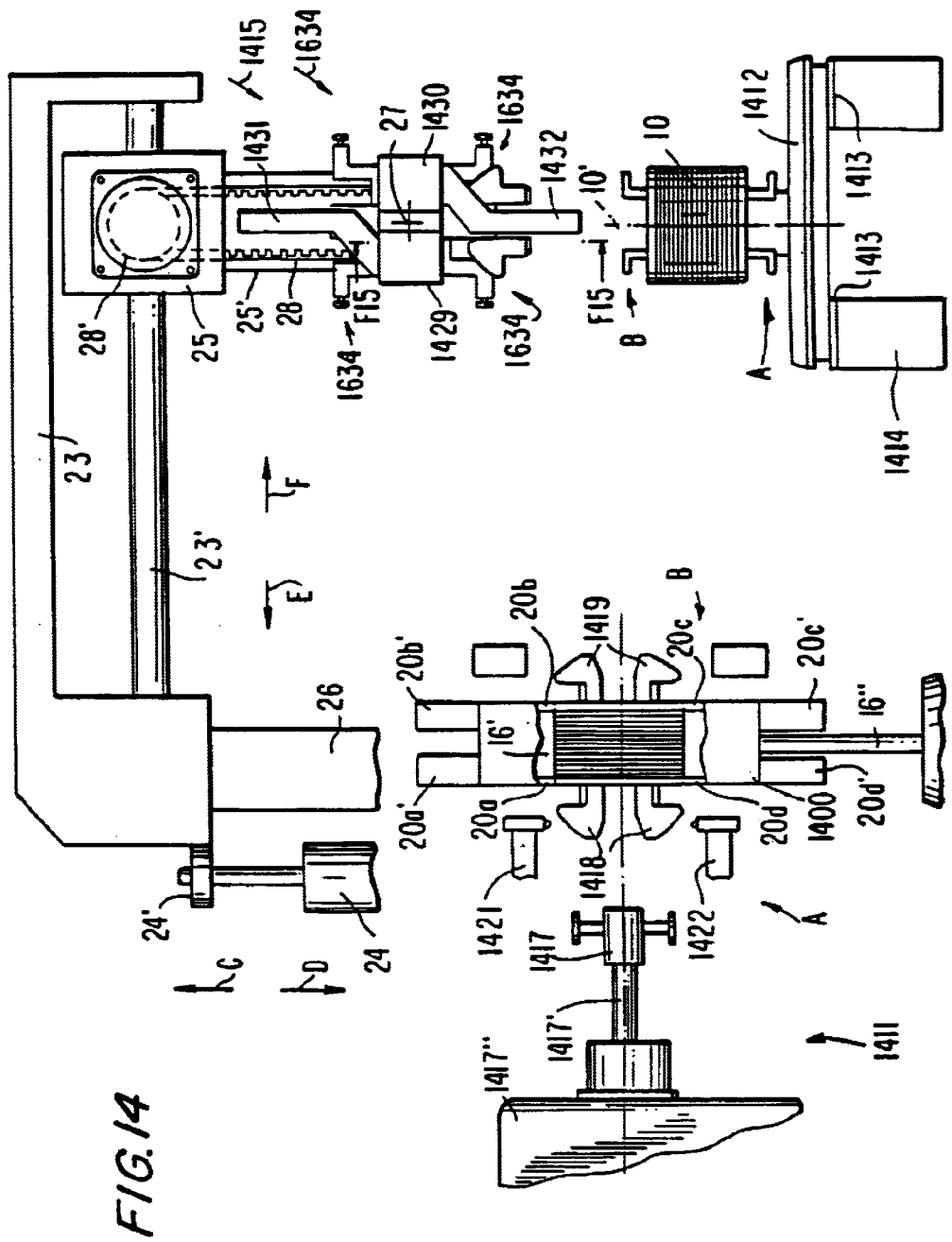
FIG. 14 is an elevational view of a portion of an illustrative load/unload device and illustrative stator housing apparatus in accordance with the principles of this invention.

FIGS. 14–18 show features of an exemplary load/unload device that may be included in some embodiments of the invention. FIG. 14 shows that stator core 10 may arrive at winder 1411 on pallet 1412 moved by belts 1413 of conveyor 1414. The pallet may reach the winder by traveling into the page containing the view of FIG. 14. Stator longitudinal axis 10' may be oriented vertically during transport by the pallet. Longitudinal axis 10' is a central axis passing through the center of the stator's bore. In some embodiments of the invention, winding needles 1417 need to translate substantially parallel to longitudinal axis 10' when winding the stator.

Load/unload device 1415 may be provided for removing an unwound stator from a pallet and for transferring a wound stator to the pallet. In some embodiments of the invention, an unwound stator on the pallet may be replaced with a wound stator from the winder. Once this replacement has occurred the pallet may travel away from the winder to bring the wound stator to other work stations of the manufacturing line.

To wind unwound stator 10, load/unload device 1415 may transfer stator 10 to housing 1400, located in front of winding needles 1417. Winding needles 1417 are driven by kinematics 1417", which may be similar to those described in above incorporated U.S. Pat. No. 4,858,835. FIG. 14 shows a stator positioned within housing 1400 with shrouds 1418 and 1419 respectively applied to ends A and B. Reference letters A and B are also shown at the conveyor to show how the stator changes in orientation in going from the conveyor to housing 1400. Housing 1400 has a central aperture for receiving and referencing the stator. Opposing chucks 16' may be provided in housing 1400 for grasping the external surface of the stator to firmly position it with respect to the winding needles. The resulting position of the stator with respect to the needles should lead to having axis 10' referenced and parallel with respect to the needle axis 1417'. Opposing chucks 16' may be similar to those described in above incorporated U.S. Pat. No. 4,969,606. Housing 1400 may be located in the winder by being rigidly fixed to upstanding frame plate 16".

Housing 1400 may be provided with locking blades 20a, 20b, 20c and 20d for locking the shrouds to the stator. Pneumatic actuators 20a', 20b', 20c', and 20d' may insert locking blades 20a, 20b, 20c, and 20d, respectively, into the stator and pull on pins of the shrouds to firmly lock the latter to the stator. Plunger arrangements 1421 and 1422 may be used to hold shrouds 1418 adjacent end A when the shrouds are to be released from the stator (for example, after a winding cycle). Lead pulls, which may be similar to those described in above incorporated U.S. Pat. No. 4,997,138, may be provided near the winder to terminate the leads of the coils directly to termination points of the stator.

The load/unload device may comprise beam structure 23 (see FIG. 14) extending between the conveyor and the winder. Beam structure 23 may move upward in vertical direction C and downward in vertical direction D (by being connected to air cylinder 24—shown fragmentarily for sake of clarity—through appendage 24'). Column 26 (shown fragmentarily, for sake of clarity) may extend downward to a base fixed to the stationary frame of the winder. Column 26 may guide the movement of the beam structure in directions C and D. Beam structure 23 may carry horizontal guide bar 23' on which trolley 25 may run in forward horizontal direction E and backward horizontal direction F. The structure of trolley 25 may extend downward (see extension 25') to reach the level of axis 27 (shown also in FIG. 15).

Figure 15:
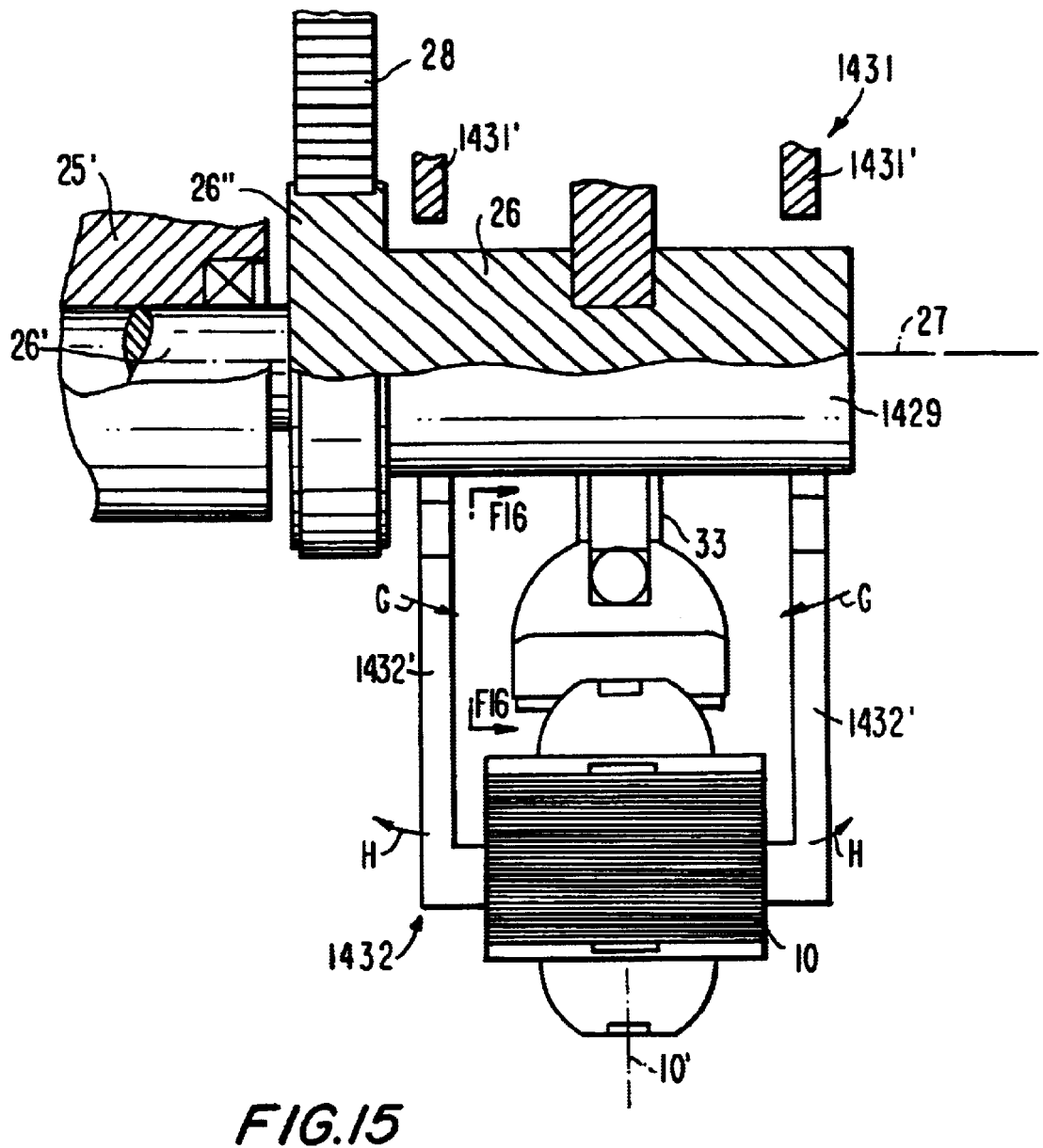
FIG. 15 is a partial sectional view of a portion of the load/unload device shown in FIG. 14 taken from line F15—F15 in FIG. 14.

FIG. 15 is a partial sectional view of a portion of load/unload device 1415, taken from line F15—F15 of FIG. 14, showing an operating condition different from that shown in FIG. 14.

FIG. 15 shows that load/unload device 1415 may include support member 26. Support member 26 may include or be connected to shaft portion 26' supported on bearings in extension 25'. Support member 26 may, therefore, rotate around axis 27. Support member 26 may be provided with pulley portion 26", engaged by belt 28. Belt 28 may be driven by motor/pulley arrangement 28' fixed to trolley 25 (see FIG. 14). FIG. 15 shows a first gripper actuator 1429, which may be flanged to a planar side of support member 26. A second gripper actuator (not shown) also may be flanged to a planar side of support member 26. Gripper actuator 1429 may carry a pair of grippers 1431 and the second gripper actuator may carry a pair of grippers 1432. Each of pairs of grippers 1431 and 1432 may have two gripping arms (see FIG. 15, showing gripping arms 1432' of pair of grippers 1432, and, in part, gripping arms 1431' of the second pair of grippers).

The gripper actuators may swing the gripping arms as shown by arrows G and H of FIG. 15 to cause the gripping arms to grasp (rotation G) or release (rotation H) the external surfaces of a stator. FIG. 15 shows pair of grippers 1432 holding a stator, while FIG. 14 shows the same pair of grippers not doing so.

Thus, load/unload device 1415 may be provided with two pairs of grippers 1431 and 1432, which may be disposed along opposite radii converging to axis 27. (When one of pairs of grippers 1431 or 1432 hold a stator, the longitudinal axis 10' of the stator may intersect axis 27 at a substantially right angle.) Each pair of grippers may grasp and release a stator. Furthermore, pairs of grippers 1431 and 1432 may rotate together around axis 27, because axis 27 is a rotation axis for support member 26. Any movement of trolley 25 in directions E and F may cause a corresponding and equal movement of support member 26 in directions E and F. Similarly, any movement of beam 23 in directions C and D may cause corresponding and equal movements of support member 26 in directions C and D.

Figure 16:
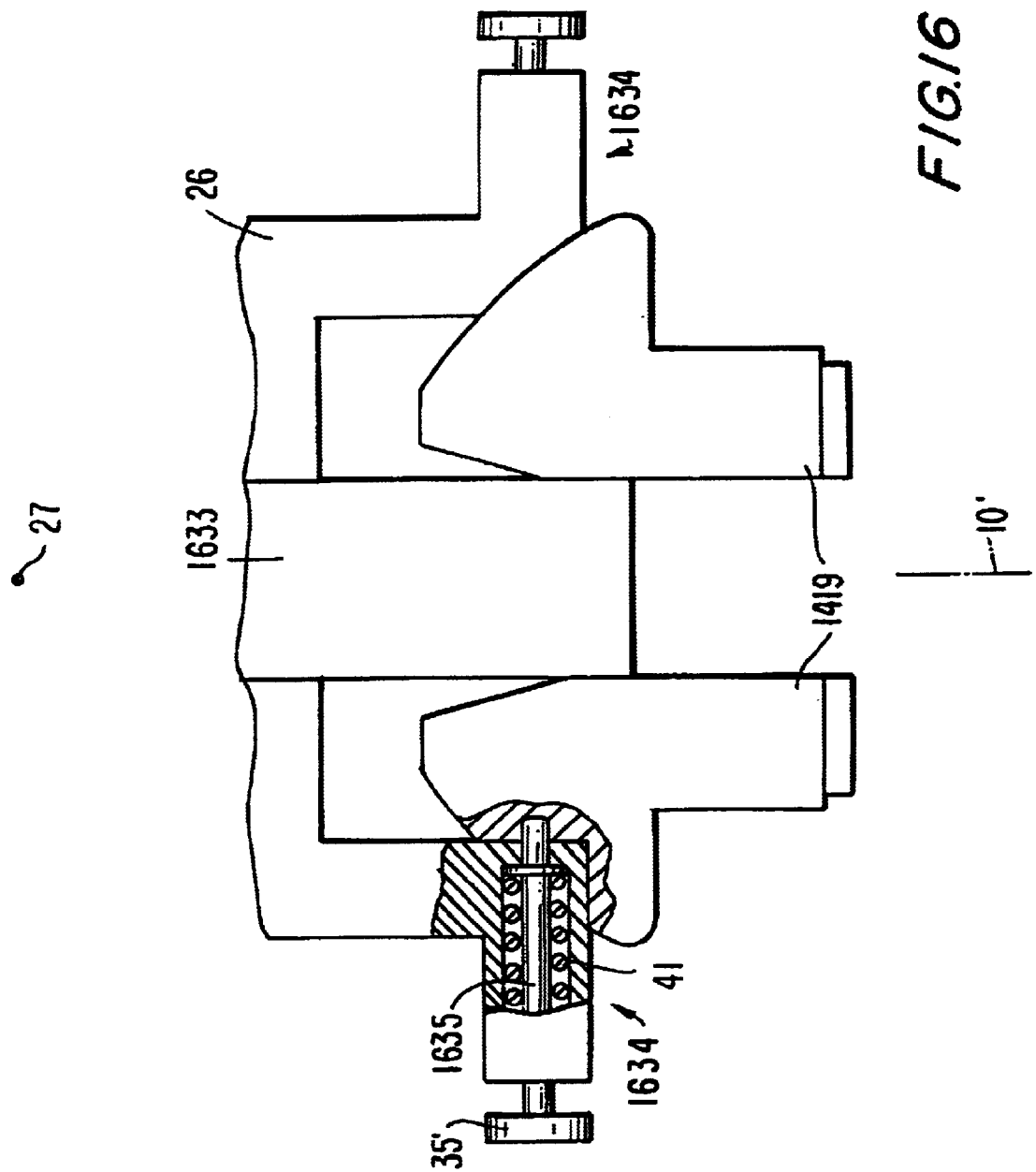
FIG. 16 is an enlarged view of a portion of the load/unload device shown in FIG. 14 taken from line F16—F16 in FIG. 15.

FIG. 16 is a partial view taken from line F16—F16 of FIG. 15. (The view of FIG. 16 is parallel to that of FIG. 14.) FIG. 16 shows that shrouds (like 1419 to be attached to a stator in housing 1400) may be carried in association with either of the pairs of grippers 1431 and 1432 of load/unload device 1415. For example, shrouds 1419 can be held adjacent to an end face of the stator being carried by pair of grippers 1431 or shrouds 1419 can be held adjacent to an end face of the stator being carried by pair of grippers 1432.

Supported in this way, the shrouds may be centered on longitudinal axis 101 of the stator to which they are adjacent, as shown in FIG. 15 for the stator held by pair of grippers 1432. This is achieved by providing a support bar 1633 that protrudes from support member 26 in association with each pair of grippers. For example, one support bar 1633 may protrude from support member 26 to be positioned between the gripping arms of pair of grippers 1431. Another support bar 1633 may protrude from support member 26 to be positioned between the gripping arms of pair of grippers 1432.

Support bars 1633 may be used as back up members for positioning the shrouds coaxial with longitudinal axis 10'. Plunger arrangements 1634 (which may also protrude from support member 26 for each pair of grippers 1431 and 1432) may push the shrouds against support bars 1633. Each plunger arrangement 1634 may be provided with a plunger shaft like 1635 which engages a respective shroud by being biased (towards the shroud) with a preloaded spring like 41. Each plunger shaft may have a tail end like 35', which may be connected to a puller which can disengage the plunger shaft from a shroud when the shroud is to be left on a stator (like shrouds 1419, for example, when they are to be attached to the stator in housing 1400) when the load/unload device is to be to moved away.

Figure 17:
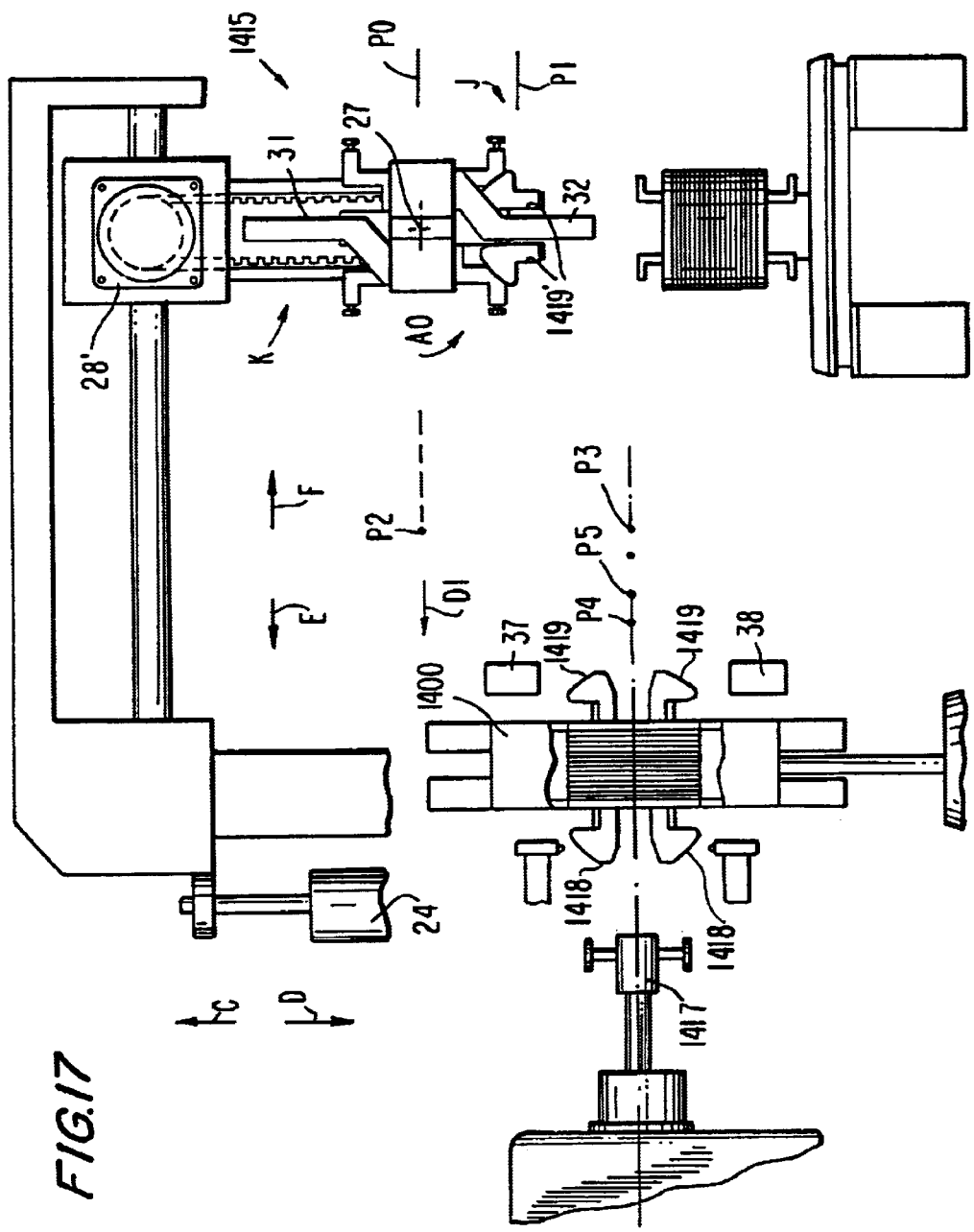
FIG. 17 is the same view as FIG. 14, but includes indications of a trajectory of the load/unload device shown in FIG. 14.

FIG. 17 is a view like the one shown in FIG. 14, but shows additional reference numerals to illustrate some of the operating principles of some embodiments of the invention. In particular, FIG.17 shows the trajectory of axis 27 (rotation axis of support member 26) during operation of load/unload device 1415. The different positions or vertical levels reached by axis 27 will be indicated with Pn, where n is a number indicating the position or vertical level reached by axis 27.

In FIG. 17, a stator, which may be in the process of being wound by needles 1417, is shown in housing 1400. Load/unload device 1415 is shown ready to collect an unwound stator on the pallet aligned by the conveyor. This position will be referred to as the "ready state." Load/unload device 1415 may have previously deposited a wound stator on a pallet which has already left the winder. The wound stator that may have left might have been held and deposited on the pallet by pair of grippers 1432 located in lower gripper position J. (Pair of grippers 1431 is shown in upper gripper position K.) As shown, pair of grippers 1432 contain shrouds, which may have been previously collected at housing 1400 at the same time that the wound stator was collected from housing 1400. The position of axis 27 relating to the ready state is indicated by P0. In the ready state, pair of grippers 1431, in position K, have neither a stator nor shrouds.

From the ready state, beam 23 may be moved in downward vertical direction D (for example, by energizing air cylinder 24) to allow pair of grippers 1432 (in gripper position J) to grasp the unwound stator waiting on the pallet. Axis 27 may be lowered to level P1, for example, so that grippers 1432, associated with shrouds 1419', can engage the stator. After the stator has been grasped, beam 23 may be moved in upward direction C (for example, back to position P0 of axis 27).

Motor 28' may be energized to cause a 90° rotation of support member 26 in an anti-clockwise direction AO around axis 27. This rotation will bring both pairs of grippers 1431 and 1432 into a substantially horizontal orientation, with pair of grippers 1431 facing towards the winder (direction D1). An air cylinder (not shown), which may be carried by beam 23, may be energized to cause trolley 25 to translate in direction E so that position P2 is reached by axis 27. Beam 23 may be moved in downward direction D by energizing air cylinder 24, so that axis 27 is brought to point P3. At level P3, the pairs of grippers 1431 and 1432 may be horizontally aligned with housing 1400 and may be ready to remove the wound stator from housing 1400 and to deposit the unwound stator in housing 1400. More particularly, pair of grippers 1431 may be open and facing housing 1400 (ready to grasp the wound stator) while pair of grippers 1432 may be facing the conveyor (holding the unwound stator and the associated shrouds) and ready to be rotated toward housing 1400. When the wound stator is ready for removal from housing 1400 (for example, after winding is complete and leads are terminated or at any other desired time), axis 27 may be moved to position P4 to allow plunger arrangements 1634 (associated with pair of grippers 1431) to grip shrouds 1419 (attached to the wound stator positioned in housing 1400).

As axis 27 travels to or reaches position P4, pullers 37 and 38, which may be permanently located at the winder and which may become engaged with tail ends 35' of plungers 1635, may retrieve plunger shafts 1635. When point P4 is reached, the pullers may release the plunger shafts so that shrouds 1419 are supported by the plunger shafts or a combination of the plunger shafts and the support bar 1633 associated with pair of grippers 1431. Locking blades 20b and 20c may be withdrawn from the stator and disengaged from shrouds 1419. Shrouds 1418 (attached to end A, as shown in FIG. 14) may be gripped by plunger arrangements 1421 and 1422, and locking blades 20a and 20d may be withdrawn from the stator and disengaged from shrouds 1418.

With the locking blades removed, the stator may be held in the housing by opposing chucks 16' (as shown in FIG. 14) and may be straddled by open pair of grippers 1431. Trolley 25 may be moved to retract axis 27, for example, to position P5. With axis 27 at P5, pair of grippers 1431 may still be within the housing and may grasp the stator, but the end face of the stator may be offset from the previously gripped shrouds as a result of the translation of axis 27. (FIG. 15, for example, shows an offset between shrouds and stator.) Opposing chucks 16' may be released to allow the wound stator to be withdrawn from the housing. In some embodiments of the invention, opposing chucks may have longitudinal recesses (as shown in above incorporated U.S. Pat. No. 4,969,606) to allow the gripping arms of the pairs of grippers to be placed between the stator and the opposing chucks while the latter are still holding the stator.

Trolley 25 may further retract in direction F so that axis 27 can be moved, for example, to point P3. This movement may completely withdraw the unwound stator from housing 1400. In position P3, support member 26 may undergo a 180° rotation to position pair of grippers 1432 facing and in alignment with housing 1400. Axis 27 may be moved to position P5, where the stator to be wound becomes positioned within the housing and grasped by opposing chucks 16'. Shrouds 1419' (associated with pairs of gripper 1432) may be attached to the unwound stator by moving axis 27 to position P4 and locking the shrouds using blades 20b and 20c. At end A of the stator, pairs of shrouds 1419' may be attached to the stator and locked by locking blades 20a and 20d.

Axis 27 may be returned to position P3 to withdraw pair of grippers 1432 (now empty) from the housing. In some embodiments, as soon as grippers 1432 are withdrawn from the (and "clear" the stator) housing, needles 1417 may commence winding wire coils on the poles of the stator in housing 1400. In some of these embodiments, load/unload device 1415 may transfer the wound stator (now held by pair of grippers 1431) toward the conveyor or any other selected station while wire winding is in progress. (This may reduce the amount of time that the wire winding apparatus is idle). Load/unload device 1415 may deposit the wound stator at the conveyor, grasp a new unwound stator and return to position P3 to exchange the new unwound stator with the newly wound stator by the time the winder completes the winding cycle. The ability to provide stator transfer and shroud retention using the same piece of equipment may avoid the need for additional time consuming processing steps performed by specialized shroud application equipment. The ability to install or remove stators and respective shrouds by virtue of one offset segment in the trajectory of a load/unload device may eliminate time consuming processing steps.

Axis 27 may be returned to position P2 and to position P0. When axis 27 has reached position P0, or before reaching position P0, a 90° rotation in anti-clockwise direction AO will bring pair of grippers 1431 and the corresponding shroud retention device, holding the wound stator and shrouds, respectively, to lower position J. Axis 27 may be moved to position P1 for depositing the wound stator on the empty pallet. (In some embodiments of the invention, the empty pallet of the conveyor may have been waiting since arriving with the unwound stator now being wound in housing 1400).

Axis 27 may be moved back to the ready state (position P0) to allow the pallet to move away. Pair of grippers 1431 is now ready to collect an unwound stator and carry the shrouds destined to be applied to end B of the next unwound stator that will be transferred from a pallet to housing 1400. This condition is the conclusion of an entire cycle of transferring an unwound stator to housing 1400 for winding and for returning a wound stator to an empty pallet of the conveyor.

According to the foregoing principles, some embodiments of the invention may require only three sets (or pairs) of shrouds: two sets (1418 and, for example, 1419) may be located at the winder for winding and another set (for example, 1419') may be transported by load/unload device 1415. Some of these embodiments may reduce the time required for exchanging wound and unwound stators in housing 1400 by alternating the shroud-carrying function between pairs of grippers 1431 and pairs of grippers 1432. For example, in a cycle that involves carrying a wound stator to the conveyor and transferring an unwound stator to the winder, pair of grippers 1431, associated with shrouds like 1419, may carry an unwound stator from conveyor to housing 1400. In the next cycle of the same type, pair of grippers 1432, associated with shrouds like 1419', may carry the subsequent unwound stator from conveyor to housing 1400. This alternative association of the unwound stator by the pairs of grippers 1431 and 1432 may continue throughout all successive cycles.

Figure 18:
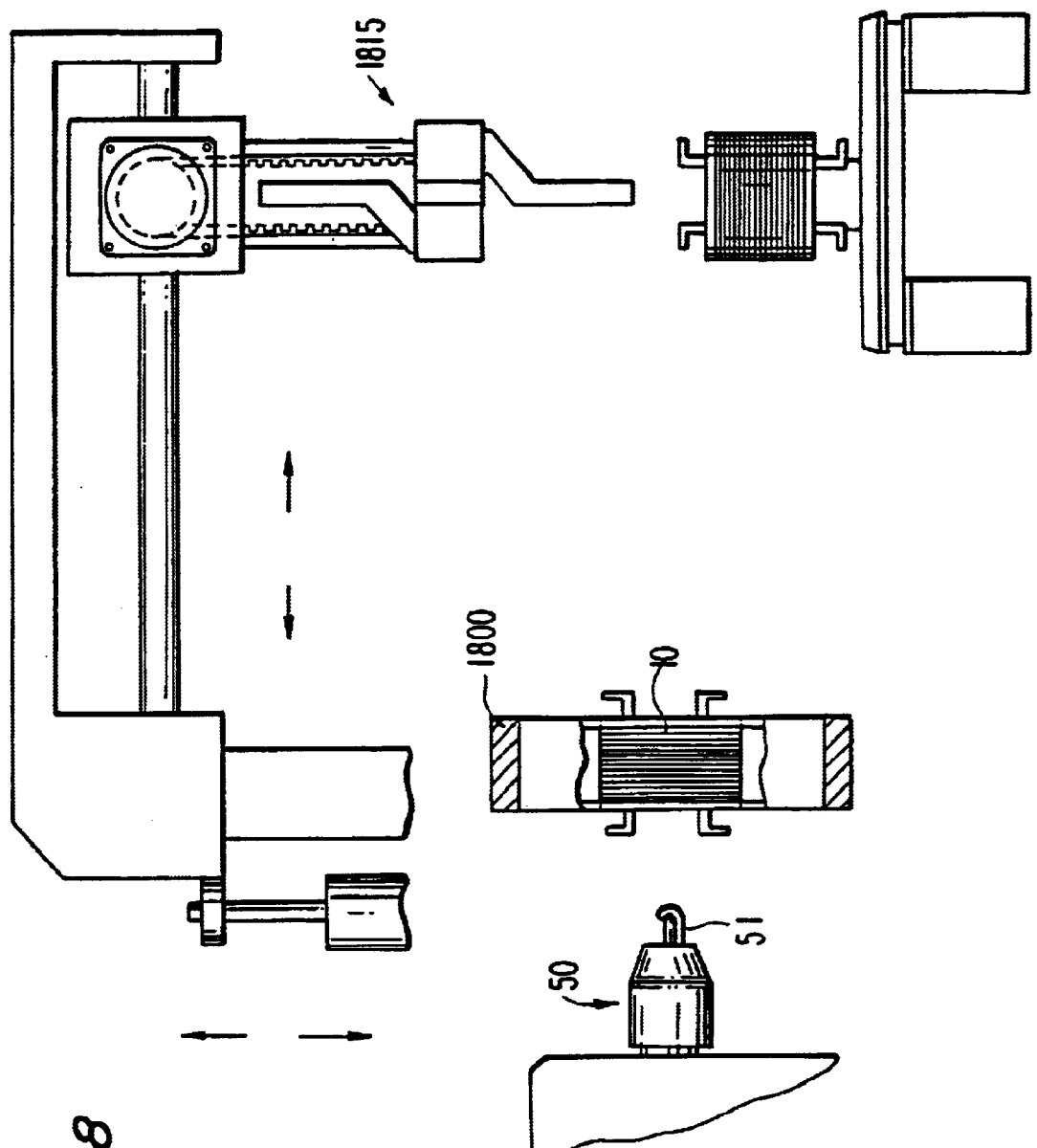
FIG. 18 is an elevational view of the load/unload device shown in FIG. 14 and a portion of an illustrative lead termination station in accordance with the principles of this invention.

FIG. 18 shows an example of an embodiment of the invention that includes load/unload device 1815, which may be similar to load/unload device 1415. FIG. 18 shows load/unload device 1815 being used to transfer a stator to housing 1800, which may be similar to housing 1400, positioned at termination station 50 where manipulators 51, similar to those described in above incorporated U.S. Pat. No. 5,065,503, may anchor leads to the termination points of the stator.

Housing 1800 may be part of a rotating transfer table on which another housing like 1400 (positioned outside the plane of FIG. 18) may be present for simultaneous positioning of a stator for winding at winding apparatus like 1417, 1417', and 1417" of FIG. 14. The wire leads of the stator may be temporarily anchored to the stator when positioned at the winder and later secured at termination station 50 after rotation of the transfer table. Load/unload device 1815 may remove wound stators from the housing at termination station 50 and transfer unwound stators to the same housing, like has been described above for transfer between the conveyor and the housing of the winder. While load/unload device 1815 is transferring stators to and from housing 1800, the winder may wind or temporarily anchor leads to the stator positioned in the other housing of the transfer table. In some of the embodiments that include load/unload device 1815, stator winding shrouds may be installed and removed at the housing at the winder and, therefore, need not be carried by the load/unload device and can be applied to the stator at the winder.

Thus it is seen that a stator transfer device, a winding shroud locking device, a stator housing with integrated locking blades, and a load/unload device for use with a stator winding system have been provided. One skilled in the art will appreciate that the present invention can be practiced by other than the described embodiments, which are presented for purposes of illustration and not of limitation, and the present invention is limited only by the claims which follow.

What is claimed is:

1. An apparatus for winding a wire coil at least one dynamoelectric machine component and anchoring at least one end of said coil, said apparatus comprising:

a machine component winder;

a wire lead anchoring device;

a transfer device configured to transfer said machine component from said winder to a position wherein said anchoring device is operatively adjacent a first end of said machine component and therefore able to operate on said first end; and a load/unload device configured to exchange said machine component with said transfer device; wherein:

said load/unload device is operatively adjacent a second end of said machine component, and therefore able to approach said machine component for engagement via said second end, when said machine component is in said position; and said first end is opposite said second end.

2. The apparatus of claim 10 wherein:

said load/unload device is opposite said anchoring device; and a portion of said transfer device is between said load/unload device and said anchoring device.

3. The apparatus of claim 1 wherein said transfer device comprises a rotating transfer table.

4. The apparatus of claim 3 wherein said transfer table is of a type selected from the group consisting of:

a. a horizontal rotating transfer table; and b. a vertical rotating transfer table.

5. The apparatus of claim 1 wherein:

said transfer device is configured to transfer a stator core; and said load/unload device is configured to exchange stator cores.

6. The apparatus of claim 1 wherein said machine component winder is configured to wind said coil on a stator.

7. The apparatus of claim 1 further comprising a device configured to temporarily secure said coil end to said machine component.

8. A method for winding a wire coil onto a dynamoelectric machine component and anchoring at least one end of said coil, said machine component having a first end and a second end opposite said first end, said method comprising:

delivering said component to a position adjacent a wire lead anchoring device, said first end facing said wire lead anchoring device;

anchoring said coil end while said component is at said position;

grasping said component, while said component is at said position, using a load/unload device positioned adjacent said second end; and transferring said component to a component conveyance device.

9. The method of claim 8 wherein said delivering comprises rotating a transfer table in a plane selected from the group consisting of:

a. a substantially horizontal plane; and b. a substantially vertical plane.

10. The method of claim 8 wherein said delivering comprises delivering a stator.

11. The method of claim 8 further comprising winding said wire coil onto said component.

12. The method of claim 11 further comprising temporarily securing said coil end.

* * * * *